(12) United States Patent
Choi et al.

(10) Patent No.: US 12,508,501 B2
(45) Date of Patent: Dec. 30, 2025

(54) VIRTUAL REALITY CONTROL SYSTEM

(71) Applicant: SKONEC ENTERTAINMENT CO., LTD., Seoul (KR)

(72) Inventors: Jeong Hwoan Choi, Yongin-si (KR); Jong Hyun Yuk, Seoul (KR); Chul Kwon, Seoul (KR); Young Moon Lee, Seoul (KR); Seung Buem Back, Suwon-si (KR)

(73) Assignee: SKONEC ENTERTAINMENT CO., LTD., Seoul (KR)

( * ) Notice: Subject to any disclaimer, the term of this patent is extended or adjusted under 35 U.S.C. 154(b) by 299 days.

(21) Appl. No.: 18/171,261

(22) Filed: Feb. 17, 2023

(65) Prior Publication Data

US 2024/0216791 A1    Jul. 4, 2024

(30) Foreign Application Priority Data

Jan. 4, 2023    (KR) .................. 10-2023-0000971

(51) Int. Cl.
*A63F 13/213*    (2014.01)
*A63F 13/52*    (2014.01)
(Continued)

(52) U.S. Cl.
CPC ............ *A63F 13/213* (2014.09); *A63F 13/52* (2014.09); *A63F 13/56* (2014.09); *G06F 3/011* (2013.01);
(Continued)

(58) Field of Classification Search
None
See application file for complete search history.

(56) References Cited

U.S. PATENT DOCUMENTS 7,864,168 B2 *   1/2011   French .................... A63F 13/45
                                                345/204
9,311,742 B1 *   4/2016   Glover .................... G06T 15/08
                          (Continued)

FOREIGN PATENT DOCUMENTS

EP        3812878 A1      4/2021
JP     2002-73246 A       3/2002
                          (Continued)

OTHER PUBLICATIONS

Notice of Allowance for JP 2023-029812 by Japan Patent Office dated Sep. 24, 2024.
(Continued)

*Primary Examiner* — Seng H Lim
(74) *Attorney, Agent, or Firm* — BROADVIEW IP LAW, PC

(57) ABSTRACT

According to embodiments, there is provided a virtual reality control system including: a sensor configured to detect an optical signal by emitting light to a target object and receiving light; a first display configured to output an image to a first user who uses a play space; a second display configured to output an image to a second user who uses the play space; and at least one or more controllers configured to control at least one of the first display and the second display, wherein the controller is configured to: acquire first position data of the first user and second position data of the second user, based on the optical signal; output an image to the first display based on the first position data; control the first display and the second display in a walk-through mode and a locomotion mode.

10 Claims, 16 Drawing Sheets

(51) Int. Cl.
*A63F 13/56* (2014.01)
*G06F 3/01* (2006.01)
*A63F 13/837* (2014.01)

(52) U.S. Cl.
CPC ..... *A63F 13/837* (2014.09); *A63F 2300/8082* (2013.01)

(56) References Cited

U.S. PATENT DOCUMENTS

| | | | | |
|---|---|---|---|---|
| 11,014,000 | B2* | 5/2021 | Koyama | A63F 13/211 |
| 11,262,848 | B1* | 3/2022 | Yu | G06F 3/016 |
| 11,517,821 | B2* | 12/2022 | Lee | A63F 13/212 |
| 11,648,478 | B2* | 5/2023 | Lee | A63F 13/837 |
| | | | | 463/31 |
| 12,090,401 | B2* | 9/2024 | Liu | A63F 13/35 |
| 2009/0278917 | A1* | 11/2009 | Dobbins | G06F 3/011 |
| | | | | 348/53 |
| 2011/0009241 | A1* | 1/2011 | Lane | G06F 3/011 |
| | | | | 482/8 |
| 2016/0253843 | A1* | 9/2016 | Lee | G06T 19/006 |
| | | | | 345/633 |
| 2018/0074332 | A1* | 3/2018 | Li | G06F 3/012 |
| 2018/0311583 | A1* | 11/2018 | Osman | A63F 13/26 |
| 2018/0356880 | A1* | 12/2018 | Kashihara | G06F 3/0346 |
| 2019/0033960 | A1 | 1/2019 | Ho et al. | |
| 2019/0033989 | A1* | 1/2019 | Wang | G06F 3/0346 |
| 2019/0043259 | A1* | 2/2019 | Wang | G06F 3/012 |
| 2019/0089817 | A1* | 3/2019 | Gulbay | G02B 27/017 |
| 2019/0329136 | A1* | 10/2019 | Koyama | A63F 13/55 |
| 2020/0183567 | A1* | 6/2020 | Gullicksen | G06F 3/0482 |
| 2020/0338453 | A1 | 10/2020 | Lee et al. | |
| 2020/0368616 | A1* | 11/2020 | Delamont | H04N 13/239 |
| 2021/0065460 | A1* | 3/2021 | Lee | G06F 3/011 |
| 2021/0104100 | A1* | 4/2021 | Whitney | G06T 13/40 |
| 2021/0125408 | A1* | 4/2021 | Song | G06F 3/011 |
| 2022/0343615 | A1 | 10/2022 | Tal et al. | |
| 2024/0216791 | A1* | 7/2024 | Choi | G06F 3/011 |

FOREIGN PATENT DOCUMENTS

| | | |
|---|---|---|
| JP | 2016-532178 A | 10/2016 |
| JP | 2021-68209 A | 4/2021 |
| KR | 10-2017-0033340 A | 3/2017 |
| KR | 10-2019-0078475 A | 7/2019 |
| KR | 10-2019-0113816 A | 10/2019 |
| KR | 10-2020-0123049 A | 10/2020 |

OTHER PUBLICATIONS

Extended European Search Report for EP 23158860.9 by European Patent Office dated Aug. 23, 2023.
Office Action for KR 10-2023-0000971 by Korean Intellectual Property Office dated Mar. 25, 2025.
Choi, Jeong-Hwan, "Conceptual design of a large-scale virtual reality education and training system", The Journal of The Korean Institute of Communication Sciences. Information and Communications Magazine, vol. 38 No. 9., Sep. 2021.

* cited by examiner

VIRTUAL REALITY CONTROL SYSTEM

CROSS REFERENCE TO RELATED APPLICATION

This application claims priority under 35 U.S.C § 119 to Korean Patent Application No. 10-2023-0000971 filed in the Korean Intellectual Property Office on Jan. 4, 2023, the entire contents of which is hereby incorporated by reference.

TECHNICAL FIELD

Embodiments relate to a virtual reality control system.

BACKGROUND ART

Virtual reality may be a technology that provides a user with virtual information added to reality or with a state of a target object in the real world as a virtual reality image generated by a program.

Such a technology for providing virtual reality may include a technology that creates a virtual space, a virtual character, and a virtual object using a program based on information provided in the real world regarding a state of the target object such as a user or an object. In this technology, information on the state of the target object may be acquired using various sensors.

The virtual reality may include a walk-through method that tracks a position of a participant and moves while matching a real movement of the target with a character of the participant in a virtual space, and a locomotion method that moves a character by using a separate controller without movement of a participant.

The walk-through method and the locomotion method have their advantages and disadvantages, and there is a need for implementing the two methods in one system.

DISCLOSURE

Technical Problem

Embodiments provide a virtual reality control system which more safely implements a walk-through mode and a locomotion mode in one experience space.

Technical Solution

A virtual reality control system comprises: a sensor configured to detect an optical signal by emitting light to a target object and receiving light; a first display configured to output an image to a first user who uses a play space; a second display configured to output an image to a second user who uses the play space; and at least one or more controllers configured to control at least one of the first display and the second display, wherein the controller is configured to: acquire first position data of the first user and second position data of the second user, based on the optical signal; output an image to the first display based on the first position data; control the first display and the second display in a walk-through mode and a locomotion mode; and when the walk-through mode is converted to the locomotion mode, display a first position guide to make a distance between the first position data and the second position data longer than or equal to a first distance in order to space the first user and the second user apart from each other.

Advantageous Effects

The virtual reality control system according to embodiments may provide a control method for converting a walk-through mode and a locomotion mode, and may more safely implement the walk-through mode and the locomotion mode in one experience space.

MODES OF INVENTION

Figure 1:
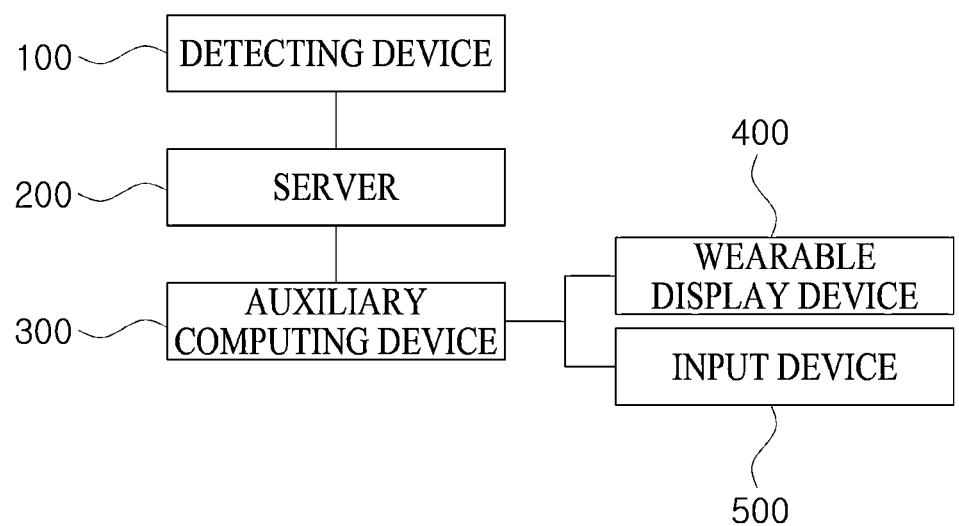
FIG. 1 is a diagram illustrating a virtual reality control system according to a first embodiment.

The above objects, characteristics, and advantages of the present invention will now be described more fully with reference to the accompanying drawings. The invention may, however, be embodied in many different forms and in description that follows, particular embodiments of the invention are illustrated in the accompanying drawings and described in detail.

In the drawings, the thicknesses of layers and regions are exaggerated for clarity. It will also be understood that when a layer is referred to as being "on" another layer or substrate, it can be directly on another layer or substrate, or intervening layers may also be present. Further, like reference numerals will be used to designate like components having similar functions throughout the drawings within the scope of the present disclosure.

Detailed descriptions of related well-known functions that are determined to unnecessarily obscure the gist of the present invention will be omitted. While the terms including an ordinal number, such as "first," "second," etc., may be used to describe various components, such components are not be limited by these terms. The terms first and second should not be used to attach any order of importance but are used to distinguish one element from another element.

Further, in the following description, usage of terms, such as "module," and "unit" used for referring to elements is given merely to facilitate explanation of the present invention, without having any significant meaning by itself.

Unlike the real world, virtual reality may be an artificial environment created by a program.

Such virtual reality may be generally classified into a virtual reality (VR) that creates a virtual space separated from reality with a program and provides an image of the virtual space, an augmented reality (AR) that provides a single image by superimposing virtual images on the real world, and a mixed reality (MR) that provides a virtual space by mixing the real world and a virtual reality and provides an image of the virtual space.

In describing virtual reality hereinafter, the virtual reality may refer to a virtual environment that provides various types of virtual spaces, as well as the above-described VR, AR, and MR.

A virtual reality control system comprises: a sensor configured to detect an optical signal by emitting light to a target object and receiving light; a first display configured to output an image to a first user who uses a play space; a second display configured to output an image to a second user who uses the play space; and at least one or more controllers configured to control at least one of the first display and the second display, wherein the controller is configured to: acquire first position data of the first user and second position data of the second user, based on the optical signal; output an image to the first display based on the first position data; control the first display and the second display in a walk-through mode and a locomotion mode; and when the walk-through mode is converted to the locomotion mode, display a first position guide to make a distance between the first position data and the second position data longer than or equal to a first distance in order to space the first user and the second user apart from each other.
  wherein, when the locomotion mode is converted to the walk-through mode, the controller is configured to display a second position guide to make the distance between the first position data and the second position data shorter than a second distance in order to gather the first user and the second user.
  wherein the first distance is longer than the second distance.
  wherein the first position guide comprises a first locomotion guide area which is displayed on the first display, and a second locomotion guide area which is displayed on the second display, and wherein the first locomotion guide area and the second locomotion guide area are spaced apart from each other.
  wherein, when the first position data is positioned in the first locomotion guide area and the second position data is positioned in the second locomotion guide area, the controller is configured to control the first display and the second display in the locomotion mode.
  wherein the controller is configured to: restrain from displaying a second character corresponding to the second user on the first display in the locomotion mode; and display the second character corresponding to the second user on the first display in the walk-through mode.
  wherein the second position guide is a waiting area that is defined as a part of the play space.
  wherein, when both the first position data and the second position data are positioned in the waiting area, the controller is configured to convert the first display and the second display to the walk-through mode.
  wherein the controller is configured to control the first display and the second display in a conversion mode when the locomotion mode is converted to the walk-through mode, and
  wherein the controller is configured to display the waiting area on the first display and the second display in the conversion mode.
  wherein the waiting area is displayed at a same position on the first display and the second display in the play space.
  wherein the controller is configured to display a conversion map in the conversion mode, and to display the second character corresponding to the second user on the first display.
  wherein, when a first character corresponding to the first user is positioned in a conversion area and the second character corresponding to the second user is positioned in the conversion area, the controller is configured to control the first display and the second display in the conversion mode.
  wherein movement of the first character to the conversion area is performed by the first user operating a first controller, and wherein movement of the second character to the conversion area is performed by the second user operating a second controller.
  wherein, even when the first character moves to the conversion area, the first position data is not changed.

Hereinafter, a virtual reality control system 10 for providing virtual reality according to one embodiment will be described with reference to FIG. 1.

FIG. 1 is a diagram illustrating an environment of a virtual reality control system 10 according to one embodiment.

Referring to FIG. 1, the virtual reality control system may include a detecting device 100, a server 200, an auxiliary computing device 300, a wearable display device 400, and an input device 500.

According to one embodiment, the detecting device 100 may be connected to the server 200.

The detecting device 100 may acquire detecting data by tracking a target object.

The target object according to one embodiment may be an object that affects an image output through the wearable display device 400.

For example, the target object may include at least one of the wearable display device 400, a user, the input device 500, an object located near the user, and an object having a reference point or a characteristic point.

In addition, the tracking of the target object according to one embodiment may mean acquiring data on a position of the target object in the reality environment.

For example, by tracking the target object, data on a position that changes according to movement of the target object in the reality environment may be acquired. The position data of the target object may be acquired at predetermined intervals but is not limited thereto.

According to one embodiment, the detecting device 100 may provide the detecting data to the server 200.

According to one embodiment, the server 200 may be connected to the detecting device 100 and the auxiliary computing device 300.

The server 200 may acquire data from the devices connected thereto.

According to one embodiment, the server 200 may acquire at least one of detecting data, image data acquired by the detecting device 100, and state data of the detecting device 100 from the detecting device 100.

In addition, the server 200 may acquire a variety of data according to some embodiments described below.

According to one embodiment, the server 200 may control the devices connected thereto.

According to one embodiment, the server 200 may control the auxiliary computing device 300 or the wearable display device 400.

In one example, the server 200 may control driving a program or application installed in the auxiliary computing device 300. More specifically, the server 200 may control start and/or termination of the program or application installed in the auxiliary computing device 300.

In another example, the server 200 may provide various settings necessary for operation of the detecting device 100.

In addition, the server 200 may generate position data of the target object or generate virtual position data corresponding to a position of the target object in a virtual environment on the basis of the detecting data.

Also, the server 200 may perform authentication of the program or application executed in the auxiliary computing device 300.

The functions of the server 200 according to one embodiment are not limited to the above-described functions, and the server 200 that performs various functions may be provided according to some embodiments.

In addition, the server 200 according to one embodiment is not necessarily provided as a single physical device and may be provided as a plurality of devices that perform individual functions which are subdivided from the above-described functions.

For example, the server 200 may be divided into a detecting server connected to the detecting device 100 and configured to acquire position data on the basis of the detecting data, an operation server configured to control some of the devices provided to the system, and a license server configured to perform authentication of a program or application executed in at least one device among the devices of the virtual reality control system 10, and relevant functions may be performed by the respective servers.

Meanwhile, the server 200 may be provided with an input signal acquired by the auxiliary computing device 300 from the input device 500 or input data based on the input signal.

The input data may include selection data of the user regarding an object or the like, data related to a motion input via the input device 500, and aiming data related to an aiming direction of the input device 500.

The auxiliary computing device 300 may be connected to at least one of the detecting device 100, the server 200, the wearable display device 400, and the input device 500.

The auxiliary computing device 300 may calculate virtual position data on the basis of the position data acquired from the server 200.

Alternatively, the auxiliary computing device 300 may calculate the position data of the target object or calculate the virtual position data by processing the detecting data acquired from the detecting device 100.

The auxiliary computing device 300 may provide an image to the user via the wearable display device 400 through a pre-stored program or application.

In addition, the auxiliary computing device 300 may provide sound data to be provided via the wearable display device 400.

According to one embodiment, the auxiliary computing device 300 may acquire an image to be provided to the user on the basis of the position data through a pre-installed program or application.

In addition, the auxiliary computing device 300 may acquire input data on the basis of the input signal acquired from the input device 500.

In addition, the auxiliary computing device 300 may acquire an image to be provided to the user by taking into account the acquired input data.

The wearable display device 400 may be connected to the auxiliary computing device 300.

The wearable display device 400 may provide an image of a virtual environment to the user.

The wearable display device 400 may visually output the virtual environment image acquired from the auxiliary computing device 300 to the user.

In addition, the wearable display device 400 may output the sound data acquired from the auxiliary computing device 300.

The input device 500 may acquire a signal related to a user's input to be reflected in the virtual environment.

The input device 500 may be connected to the auxiliary computing device 300.

The input device 500 may provide an input signal that corresponds to the user's input to the auxiliary computing device 300.

The input device 500 may include an acceleration sensor, a gyroscope, a gyro sensor, microelectromechanical systems (MEMS), a geomagnetic sensor, an inertial measurement sensor (IMIU), an optical sensor, an illuminance sensor, a photo sensor, an infrared sensor, a color sensor, a depth sensor, an electromagnetic wave sensor, and the like for acquiring a signal corresponding to a movement of the user.

In addition, the input device 500 may include a button, a switch, a jog shuttle, a wheel, and the like for acquiring a signal related to the user's selection.

In addition, the input device 500 may be connected to the auxiliary computing device 300 through at least one of wired communication and wireless communication.

Also, the input device 500 may include a communication module for communicating with the auxiliary computing device 300.

FIG. 1 illustrates that the input device 500 is connected to the auxiliary computing device 300, but the embodiment is not limited thereto, and the input device 500 may be provided in various connection forms according to the selection.

For example, the input device 500 may be connected to the server 200 and the wearable display device 400 and provide an input signal thereto.

The above-described virtual reality control system 10 is merely an example for convenience of description. The virtual reality control system 10 according to one embodiment is not limited to the configuration and connection relationship shown in FIG. 1 and may be provided in various forms according to the selection.

In one example, the auxiliary computing device 300 and the wearable display device 400 may be provided as one device, and in this case, operations performed in the auxiliary computing device 300 may be implemented in the wearable display device 400.

However, in the following description of the various embodiments, the above-described virtual reality control system 10 will be described as an example for convenience of description.

Hereinafter, a detecting device 100 according to one embodiment will be described with reference to FIG. 2.

Figure 2:
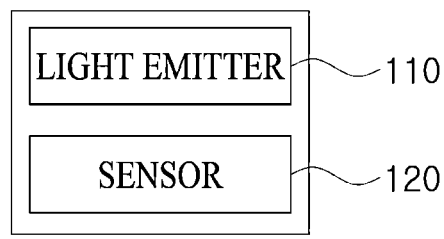
FIG. 2 is a block diagram illustrating a detecting device according to the first embodiment.

FIG. 2 is a block diagram illustrating a detecting device according to one embodiment.

Referring to FIG. 2, the detecting device 100 may include a light emitter 110 and a sensor 120.

The light emitter 110 may project a signal to the target object or to the vicinity of the target object for tracking.

In one example, the light emitter 110 may be provided as a light-emitting device that projects an optical signal such as visible light, infrared light, or the like.

More specifically, the light emitter may be provided as a visible-light light emitting diode (LED), an infrared LED, or the like.

The sensor 120 may acquire a signal from an external source.

In one example, the sensor 120 may acquire a signal corresponding to the signal projected from the light emitter 110.

In another example, the sensor 120 may acquire a signal related to light reflected by a marker provided on the target object.

For example, the sensor 120 may be provided as an image sensor, an optical sensor, an illuminance sensor, a photo sensor, an infrared sensor, a color sensor, a depth sensor, an electromagnetic wave sensor, or the like.

Figure 3:
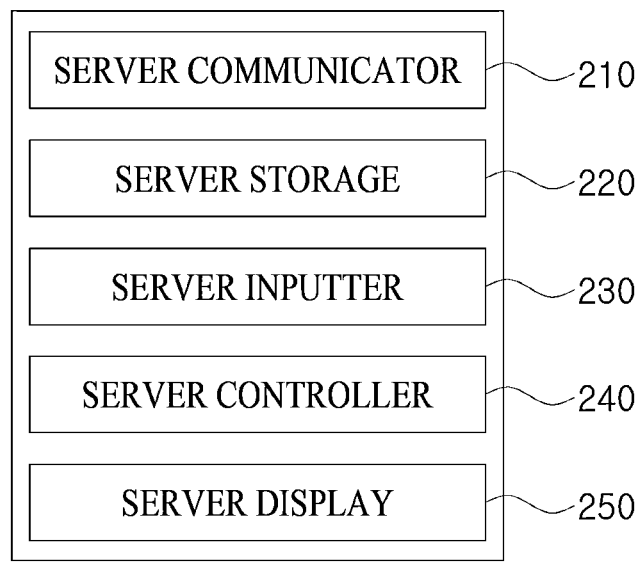
FIG. 3 is a block diagram illustrating a server according to the first embodiment.

FIG. 3 is a block diagram illustrating a server 200 according to one embodiment.

Referring to FIG. 3, the server 200 may include a server communicator 210, a server storage 220, a server inputter 230, a server controller 240, and a server display 250.

The server communicator 210 may be connected to at least one of the detecting device 100, the auxiliary computing device 300, the wearable display device 400, and the input device 500 to acquire or provide data therefrom or thereto.

The server communicator 210 may be connected to at least one of the detecting device 100, the auxiliary computing device 300, the wearable display device 400, and the input device 500 through at least one of wired communication and wireless communication.

For example, the wireless communication may include a mobile communication network, such as a Wi-Fi network, a 3rd generation (3G) network, a long-term evolution (LTE) network, a 5G network, and Long Range (LoRA), wireless access in vehicular environment (WAVE), beacon, ZigBee, Bluetooth, Bluetooth low energy, or the like.

In addition, the wired communication may include a twisted-pair cable, a coaxial cable, an optical fiber cable, or the like.

The server communicator 210 may be provided as a communication module for providing at least one of the wired communication and the wireless communication.

The server storage 220 may store data therein.

The server storage 220 may store data acquired from an external source.

In addition, the server storage 220 may store data necessary for operation of the server 200.

For example, the server storage 220 may be provided as a hard disk, a floppy disk, a magnetic medium, such as magnetic tape, an optical medium, such as a compact disc read only memory (CD-ROM), a digital versatile disc, or the like, a magneto-optical medium, such as a floptical disk, a read only memory (ROM), a random access memory (RAM), a flash memory, a solid state drive (SSD), a CD-ROM, a DVD-ROM, a Universal Serial Bus (USB), or the like.

The server inputter 230 may acquire a signal corresponding to an input of the user.

The input of the user may be, for example, a press, a click, a touch, or a drag of a button.

The server inputter 230 may be implemented as, for example, a keyboard, a key pad, a jog shuttle, or a wheel.

The server controller 240 may control an overall operation of the server 200.

For example, the server controller 240 may control the operation of a device included in the server 200.

The server display 250 may output visual data.

The server display 250 may be provided as a monitor, a TV, a display panel, or the like, which outputs visual data.

In addition, when the server display 250 is provided as a touch screen, the server display 250 may perform a function of the server inputter 230.

Figure 4:
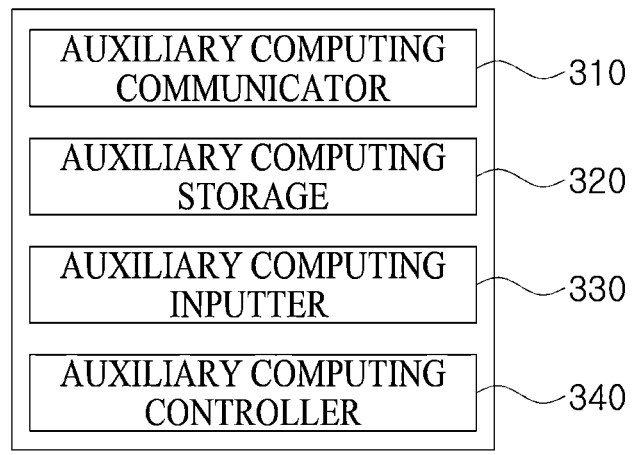
FIG. 4 is a block diagram illustrating an auxiliary computing device according to the first embodiment.

FIG. 4 is a block diagram illustrating an auxiliary computing device 300 according to one embodiment.

Referring to FIG. 4, the auxiliary computing device 300 may include an auxiliary computing communicator 310, an auxiliary computing storage 320, an auxiliary computing inputter 330, and an auxiliary computing controller 340.

The auxiliary computing communicator 310 may be connected to at least one of the server 200, the wearable display device 400, and the input device 500.

The auxiliary computing communicator 310 may be connected to at least one of the server 200, the wearable display device 400 and the input device 500 through at least one of wired communication and wireless communication.

The auxiliary computing communicator 310 may exchange data with at least one of the connected server 200, the connected wearable display device, and the connected input device 500.

For example, the wireless communication may include a mobile communication network, such as a Wi-Fi network, a 3G network, an LTE network, a 5G network, and LoRA, WAVE, beacon, ZigBee, Bluetooth, Bluetooth low energy, and the like.

In addition, the wired communication may include a twisted-pair cable, a coaxial cable, an optical fiber cable, or the like.

The auxiliary computing communicator 310 may be provided as a communication module for providing at least one of the wired communication and the wireless communication.

The auxiliary computing storage 320 may store data acquired from an external source.

In addition, the auxiliary computing storage 320 may store data necessary for operation of the auxiliary computing device 300.

Also, the auxiliary computing storage 320 may store therein an application or program therein to provide a virtual experience to the user.

The auxiliary computing inputter 330 may acquire a signal corresponding to an input of the user.

The input of the user may be, for example, a press, a click, a touch, or a drag of a button.

For example, the auxiliary computing inputter 330 may be implemented as, for example, a keyboard, a key pad, a jog shuttle, or a wheel.

The auxiliary computing controller 340 may control an overall operation of the auxiliary computing device 300.

Figure 5:
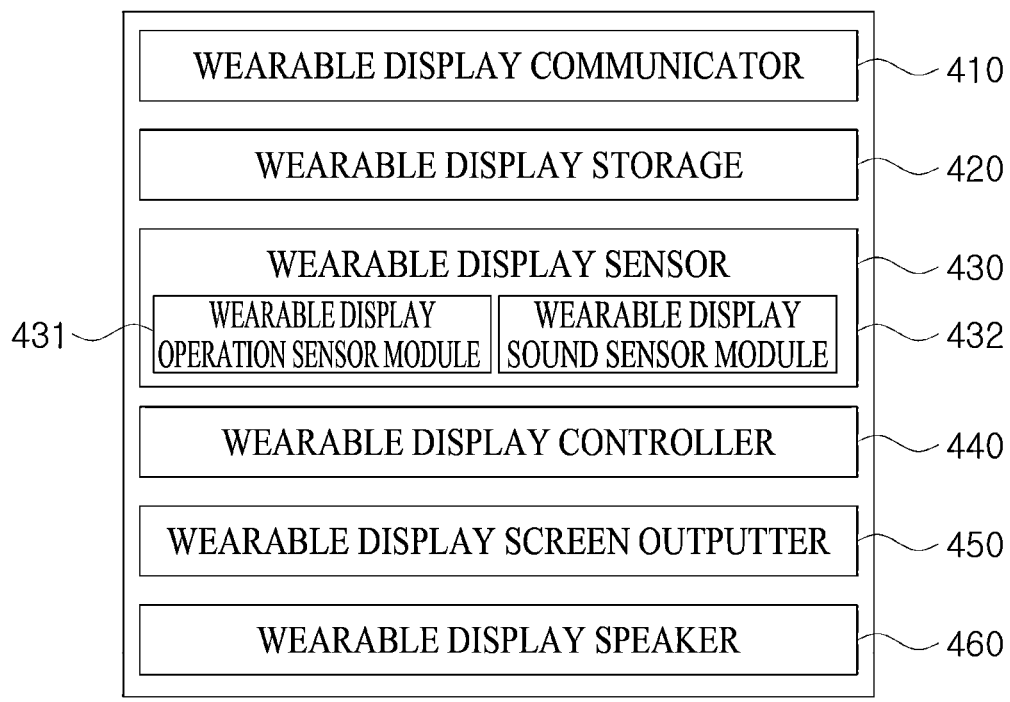
FIG. 5 is a diagram illustrating a wearable display device according to the first embodiment.

FIG. 5 is a diagram illustrating a wearable display device 400 according to one embodiment.

Referring to FIG. 5, the wearable display device 400 may include a wearable display communicator 410, a wearable display storage 420, a wearable display sensor 430, a wearable display controller 440, a wearable display screen outputter 450, and a wearable display speaker 460.

The wearable display communicator 410 may be connected to the auxiliary computing device 300.

The wearable display communicator 410 may be connected to the auxiliary computing device 300 through at least one of wired communication and wireless communication.

The wearable display storage 420 may store data therein.

The wearable display storage 420 may store an application or program necessary for operation of the wearable display device 400.

In addition, the wearable display storage 420 may store data acquired from an external source.

The wearable display sensor 430 may acquire a state of the wearable display device 400 and a signal corresponding to an input of the user.

The wearable display sensor 430 according to one embodiment may include a wearable display operation sensor module 431 and a wearable display sound sensor module 432.

The wearable display operation sensor module 431 may acquire a signal related to a state of the wearable display device 400.

In one example, the wearable display operation sensor module 431 may acquire rotation data related to a rotation of the wearable display device 400.

In another example, the wearable display operation sensor module 431 may acquire movement data related to a position movement of the wearable display device 400.

The wearable display operation sensor module 431 may include an acceleration sensor, a gyroscope, a gyro sensor, MEMS, a geomagnetic sensor, an IMIU, an optical sensor, an illuminance sensor, a photo sensor, an infrared sensor, a color sensor, a depth sensor, an electromagnetic wave sensor, and the like.

The wearable display sound sensor module 432 may acquire a signal corresponding to a sound externally input.

In one example, the wearable display sound sensor module 432 may be a microphone.

The wearable display controller 440 may control an overall operation of the wearable display device 400.

The wearable display screen outputter 450 may output visual data to the user.

In one example, the wearable display screen outputter 450 may output an image of virtual reality. In another example, the wearable display screen outputter 450 may output an image of a three-dimensional (3D) virtual reality.

The wearable display screen outputter 450 may be provided as an image outputting device, such as a liquid crystal display (LCD), electronic paper, an LED display, organic light emitting diode (OLED) display, a curved display, a stereoscopy (a 3D display using binocular disparity), or the like.

The wearable display speaker 460 may output auditory data.

The wearable display speaker 460 may be provided as a sound device, such as a tuner, a player, an amplifier, a speaker, or the like.

Figure 6:
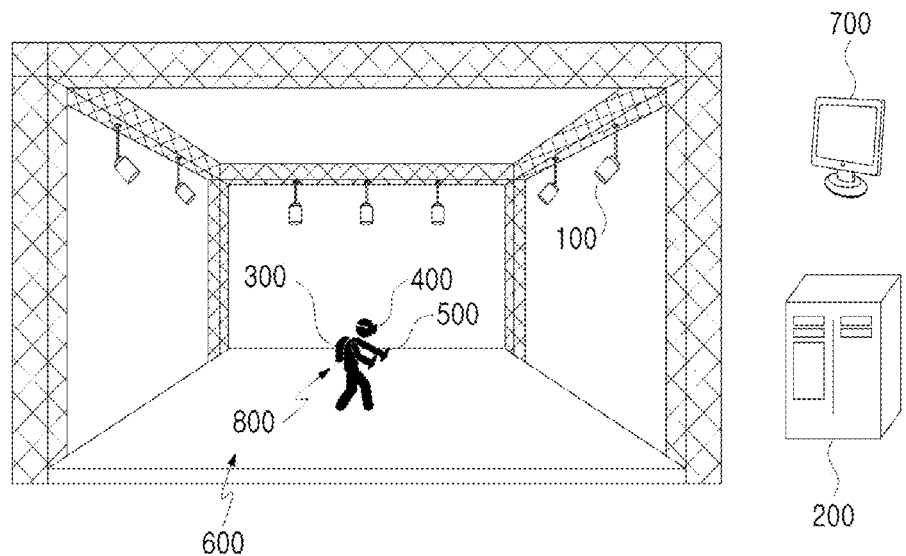
FIG. 6 is a diagram illustrating an implementation example of the virtual reality control system according to the first embodiment.

FIG. 6 is a diagram illustrating an implementation example of a virtual reality control system 10 according to one embodiment.

Referring to FIG. 6, the virtual reality control system 10 may provide at least one user 800 with a tracking area 600 for a virtual experience.

In addition, in the tracking area 600, the user 800 may be provided with at least one of an auxiliary computing device 300, a wearable display device 400, and an input device 500.

In addition, a target object to be provided to the user 800 may be provided with a marker M.

For example, when target objects are the wearable display device 400 and the input device 500, the wearable display device 400 and the input device 500 may be provided with markers M in different patterns.

A pattern in which the marker M is provided will be described below.

In addition, the tracking area 600 may be provided with at least one detecting device 100.

For example, as shown in FIG. 6, the tracking area 600 may be provided with a plurality of detecting devices 100.

The detecting devices 100 may be provided to be spaced apart from each other at predetermined intervals around the periphery of the tracking area 600.

In addition, the detecting devices 100 may be provided to be spaced apart from each other at a predetermined height from the ground.

In addition, the detecting devices 100 may be provided to be oriented toward the tracking area 600.

The detecting devices 100 may be fixedly installed on a pre-installed frame.

For example, as shown in FIG. 6, a frame for installing the detecting devices 100 may be provided around the tracking area 600. In addition, the detecting devices 100 may be fixedly installed on the frame.

The detecting devices 100 may acquire detecting data related to the tracking area 600.

A sensor 120 included in the detecting device 100 may acquire detecting data related to at least a part of the tracking area 600.

The detecting device 100 may provide the detecting data to a server 200 or an auxiliary computing device 300.

For example, the detecting device 100 may provide the detecting data acquired by the sensor 120 to the server 200.

The server 200 may acquire real-time position data of the target object on the basis of the detecting data.

As shown in FIG. 6, when the plurality of detecting devices 100 are provided in the tracking area 600, the server 200 or the auxiliary computing device 300 may acquire detecting data from the plurality of detecting devices 100, and acquire the current position data of the target object on the basis of the acquired detecting data.

In addition, the server 200 or the auxiliary computing device 300 may acquire virtual position data of at least one target object on the basis of position data of target objects.

For example, the auxiliary computing device 300 may acquire coordinates in the virtual reality corresponding to coordinates included in position data of the user 800 in the real world as virtual position data of a character in the virtual reality corresponding to the user 800.

The server 200 may provide at least one of the position data and the virtual position data of the target object to the auxiliary computing device 300.

The auxiliary computing device 300 may calculate the virtual position data on the basis of the acquired position data.

In addition, the auxiliary computing device 300 may acquire a virtual environment image on the basis of the virtual position data.

For example, a virtual environment necessary for a virtual experience is constructed by a program or application stored in the auxiliary computing storage 320 and the auxiliary computing device 300 may acquire a virtual environment image area from the virtual environment on the basis of the acquired virtual position data. The auxiliary computing device 300 may acquire a virtual environment image related to the virtual environment image area.

The auxiliary computing device 300 may provide the virtual environment image to the wearable display device 400.

The wearable display device 400 may output the virtual environment image to the user 800.

In addition, the server 200 may provide the virtual environment image to a monitoring display device 700.

The server 200 may provide the virtual environment image acquired from the auxiliary computing device 300 to the connected monitoring display device 700.

In addition, when the server 200 is connected to a plurality of auxiliary computing devices 300, the server 200 may acquire a virtual environment image from at least one auxiliary computing device 300 among the plurality of auxiliary computing devices 300 and provide the acquired virtual environment image to the connected monitoring display device 700.

For example, the server 200 may obtain selection of auxiliary computing devices 300 from which the virtual environment image is to be acquired from among the auxiliary computing devices 300 connected to the server 200 through the server inputter 230, and may provide the virtual environment image acquired from the selected auxiliary computing device 300 to the monitoring display device 700.

In addition, the server 200 may acquire the virtual position data from the auxiliary computing device 300 and acquire a virtual environment image on the basis of the acquired virtual position data and a pre-set position of a virtual camera in the virtual environment.

In addition, the server 200 may provide the acquired virtual environment image to the connected monitoring display device 700.

The monitoring display device 700 may output the virtual environment image acquired from the server 200.

In addition, the input device 500 may be provided to be connected to at least one of the server 200, the auxiliary computing device 300, and the wearable display device 400.

In addition, the input device 500 may be provided with at least one marker M.

The input device 500 may be provided such that each user 800 carries the input device 500.

For example, the user 800 may carry the input device 500 in his/her hand.

According to one embodiment, the server 200 may acquire position data of the input device 500 on the basis of the detecting data acquired from the detecting device 100. In addition, the reality position data of the input device 500 may include at least one of position data or orientation direction data of the input device 500 in the tracking area 600.

The auxiliary computing device 300 may determine an orientation direction of a virtual object corresponding to the input device 500 in the virtual environment on the basis of the position data of the input device 500.

In addition, the auxiliary computing device 300 may acquire a virtual image in which the orientation direction of the virtual object corresponding to the input device 500 in the virtual environment is taken into consideration.

For example, the auxiliary computing device 300 may acquire a virtual image in which a gun corresponding to the input device 500 is oriented in a direction corresponding to an orientation direction of the input device 500 in the virtual environment.

In addition, the auxiliary computing device 300 may acquire a virtual image in which the generation of an event in accordance with an event generation command of the user 800 through the input device 500 in the virtual environment is taken into consideration.

For example, when the user 800 presses a switch provided to the input device 500, the auxiliary computing device 300 may acquire a virtual image showing that a character corresponding to the user 800 fires a gun in the virtual environment.

Figure 7:
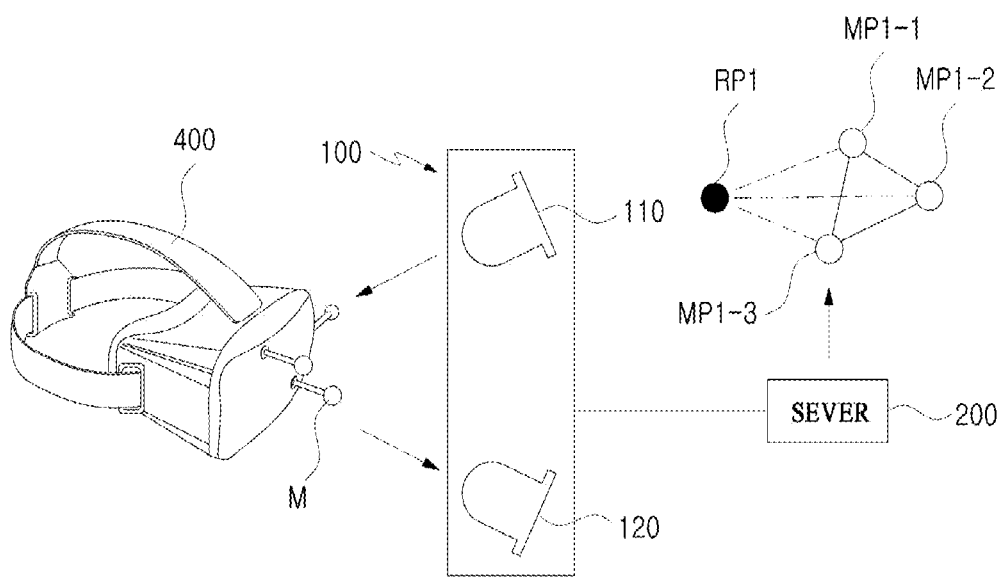
FIG. 7 is a schematic diagram illustrating a method of tracking a target object according to the first embodiment.

FIG. 7 is a schematic diagram illustrating a method of tracking a target object according to one embodiment.

Referring to FIG. 7, the method of tracking a target object may acquire data related to the target object using an externally provided sensor and determine a position of the target object on the basis of the acquired data related to the target object.

Hereinafter, an example in which the target object is a wearable display device 400 will be described with reference to FIG. 7.

Referring to FIG. 7, the target object may be provided with a marker M for identifying the target object.

The marker M may be provided on the target object and serve as a reference for identifying and tracking the target object.

In order to track a target object, it is necessary to distinguish between the target object and other devices, and it may be possible to identify the target object by providing a marker M to the target object.

In addition, when a plurality of target objects are provided, it is necessary to identify each of the target objects, and to this end, a marker provided on one object may be distinguishable from another marker M provided on another object.

For example, a marker M provided on one target object may be provided in a pattern different from that of another marker M provided on another target object.

In addition, the pattern may include various types of patterns, such as a pattern formed by a plurality of marker M provided at different positions, an optical pattern provided to one display panel, and the like.

The pattern may be formed by marker coordinates of the marker M.

For example, three markers M may be tracked by the detecting device 100 so that first marker coordinates MP1-1, second marker coordinates MP1-2, and third marker coordinates MP1-3 may be acquired as detecting data, and the first marker coordinates MP1-1 to the third marker coordinates MP1-3 may form a triangular-shaped pattern.

In addition, the marker M may be provided as a passive marker, which reflects or absorbs an optical signal projected from a light emitter 110, and an active marker, which autonomously emits an optical signal.

For example, the passive marker may include a three-dimensional model with a light reflective material attached thereto, paper on which a recognizable code is printed, reflective tape, and the like.

In addition, the active marker may include an LED module, a radio wave generator, and the like.

According to one embodiment, the target object may be provided with at least one marker M.

For example, when the virtual reality control system 10 tracks a position of only one object, only one marker M may be provided on the target object.

In addition, even when the virtual reality control system 10 tracks a position of only one object, the target object may be provided with a plurality of markers M.

In addition, when the virtual reality control system 10 tracks positions of a plurality of target objects, one target object may be provided with a plurality of markers M forming a pattern in order to identify each of the plurality of target objects.

For example, when target objects whose positions are tracked by the virtual reality control system 10 are a wearable display device 400 and an input device 500, the wearable display device 400 may be provided with a marker M in a first pattern, and the input device 500 may be provided with a marker M in a second pattern.

The first pattern is different from the second pattern, and the first pattern which is detected during the position tracking may be identified as the wearable display device 400, and the second pattern detected may be identified as the input device 500.

In the above description, when a plurality of target objects are provided, the markers M provided on each of the plurality of objects are provided to form a pattern in order to identify each of the plurality of objects. However, the embodiment is not limited thereto, and even when a single target object is provided, markers M provided on the target object may be formed to form a pattern.

In addition, the pattern of the markers M provided on the target object may be used to identify the user 800.

For example, the first pattern may be identified as the wearable display device 400 worn by a first user and the second pattern may be identified as the input device 500 carried by the first user. In addition, a third pattern may be identified as a wearable display device 400 worn by a second user and a fourth pattern may be identified as an input device 500 carried by the second user.

To track the target object, a server 200 may acquire data related to the target object from the detecting device 100 and acquire detecting data related to a position of the target object on the basis of the acquired data. In addition, the server 200 may calculate the position data of the target object on the basis of the detecting data.

A description of a technique by which the detecting device 100 to provide data related to a target object to the server 200 will be given. The light emitter 110 of the detecting device 100 may project a signal to at least a part of the tracking area 600.

For example, when the light emitter 110 is an infrared LED, the light emitter 110 may project an infrared signal to at least a part of the tracking area 600.

In addition, a sensor 120 may provide data acquired from an external source to the server 200.

In one example, when the sensor 120 is a camera, the sensor 120 may provide an image signal acquired from an external source to the server 200.

Although FIG. 7 illustrates only one sensor 120, the embodiment is not limited thereto. As described in FIG. 6, a plurality of sensors 120 may be provided and each of the plurality of sensors 120 may provide acquired data to the server 200.

The server 200 may determine the position of the target object on the basis of the data acquired from the sensor 120.

The server 200 may determine whether the data acquired from the sensor 120 includes data related to a marker M. In addition, when it is determined that the data related to the marker M is included in the data acquired from the sensor 120, the server 200 may identify the target object on the basis of a pattern of the marker M.

For example, when the data acquired from the sensor 120 includes a first pattern, the server 200 may identify the target object as the wearable display device 400.

A plurality of patterns may be present in the data acquired from one sensor 120, and the server 200 may identify the plurality of patterns.

The patterns may be pre-stored in the server 200, and when the pre-stored pattern is present in the acquired data, the server 200 may determine that the corresponding pattern is present and may identify a target object corresponding to the pattern.

The server 200 may determine the position of the target object on the basis of the data acquired from the sensor 120.

Meanwhile, a representative point RP related to each of the pre-stored patterns may be set in the server 200.

The representative point RP may be a point that represents a pattern.

The presentative point RP may be present outside of the pattern.

For example, the representative point RP may be set to a point spaced a predetermined distance from a plane formed by first marker coordinates MK1-1, second marker coordinates MK1-2, and third marker coordinates MK1-3.

When a pattern based on a plurality of markers M is provided, coordinate data related to the plurality of markers M included in the pattern may be acquired and the server 200 may acquire a representative point RP representing the pattern as the position data of the target object to which the pattern is provided.

Therefore, the server 200 may acquire the position data of the target object, thereby being capable of tracking the target object.

The method of tracking a position of a target object is not limited to the above examples, and various types of methods of tracking a position may be used according to selection.

According to one embodiment, when the sensor 120 is provided as an image sensor, the sensor 120 may acquire an external image and acquire position data related to the target object on the basis of the acquired image.

In one example, when the sensor 120 shown in FIG. 7 is provided to the wearable display device 400, the sensor 120 may be provided on one side of the wearable display device 400 and be oriented in an outward direction from the inside of the wearable display device 400 to acquire image data related to the outside of the wearable display device 400.

In addition, the wearable display device 400 may provide the acquired image data to the auxiliary computing device 300.

According to one embodiment, the wearable display device 400 may provide the image data to the auxiliary computing device 300 at a predetermined interval.

For example, the wearable display device 400 may provide the image data to the auxiliary computing device 300 at the same interval as that at which the image data is acquired through the sensor 120.

The auxiliary computing device 300 may acquire at least one characteristic point from the acquired image data.

According to one embodiment, the auxiliary computing device 300 may acquire an object included in the image data as the characteristic point.

According to one embodiment, the auxiliary computing device 300 may acquire an object greater than a predetermined size from among objects included in the image data as the characteristic point.

The auxiliary computing device 300 may identify the objects included in the image data and acquire an object greater than a predetermined size from among the identified objects as the characteristic point. In addition, the auxiliary computing device 300 may determine a size of the object on the basis of the number of pixels occupied by the object included in the image data.

According to one embodiment, the auxiliary computing device 300 may acquire a pre-set type of object from among the objects included in the image data as the characteristic point.

For example, when a ball type object is pre-set, the auxiliary computing device 300 may acquire a ball type object, such as a baseball ball, a soccer ball, a basketball ball, or the like, which is included in the image data, as the characteristic point.

According to one embodiment, the auxiliary computing device 300 may acquire a marker included in the image data as the characteristic point.

The auxiliary computing device 300 may identify a marker, such as a barcode, a quick response (QR) code, or the like, which is included in the image data, and acquire the marker as the characteristic point.

In addition, the auxiliary computing device 300 may determine a position of the characteristic point included in the image data.

The auxiliary computing device 300 may determine at least one of a position change and a size change of the characteristic point on the basis of the image data acquired from the wearable display device 400.

The auxiliary computing device 300 may determine a moving direction and a moving distance of the wearable display device 400 on the basis of a position change direction, a position variation, and a size variation of the characteristic point.

For example, the auxiliary computing device 300 may determine a position change of the characteristic point on the basis of image data acquired from the wearable display device 400.

The auxiliary computing device 300 may determine a moving direction and a moving distance of the wearable display device 400.

The auxiliary computing device 300 may determine a moving direction and a moving distance of the wearable display device 400 on the basis of a position change direction, a position variation, and a size variation of the characteristic point.

For example, the auxiliary computing device 300 may compare a position of a characteristic point included in first image data acquired at a first point in time with a position of a characteristic point included in second image data acquired at a second point in time that is later than the first point in time, and when the comparison shows that the characteristic point in the first image data is moved to the right in the second image data, may determine that the wearable display device 400 is moved to the left.

In addition, the auxiliary computing device 300 may determine a moving distance of the characteristic point when the position of the characteristic point is changed.

The auxiliary computing device may determine a moving distance of the characteristic point on the basis of the number of pixels between the position of the characteristic point in the first image data and the position of the characteristic point in the second image data.

Alternatively, the auxiliary computing device 300 may determine a moving distance of the characteristic point on the basis of coordinates of the characteristic point in the first image data and coordinates of the characteristic point in the second image data.

Also, for example, the auxiliary computing device 300 may determine a moving direction and a moving distance of the wearable display device on the basis of the size variation.

The auxiliary computing device 300 may compare a size of a characteristic point included in the first image data acquired at the first point in time with a size of a characteristic point included in the second image data acquired at the second point in time that is later than the first point in time, and when the comparison shows that the position of the characteristic point in the first image data is moved to the right in the second image data, may determine that the wearable display device 400 is moved to the left.

Accordingly, the auxiliary computing device 300 may track the position of the target object on the basis of a change in position of the target object relative to a pre-set initial position.

Figure 8:
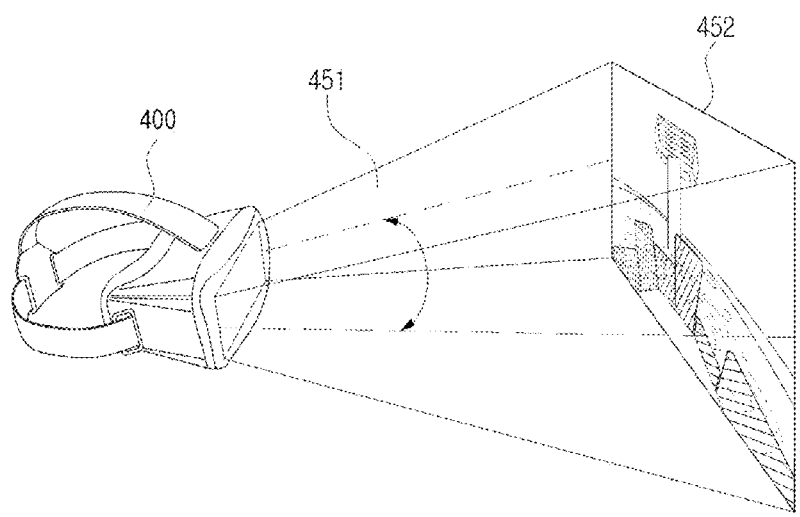
FIG. 8 is a diagram illustrating an example of outputting a virtual environment image through a wearable display device according to the first embodiment.

FIG. 8 is a diagram illustrating an example of outputting a virtual environment image 452 through a wearable display device according to one embodiment.

Referring to FIG. 8, a virtual reality control system 10 may provide a virtual environment image 452 related to at least a part of a virtual environment to a user 800 through a wearable display device 400.

The virtual environment may include the background, terrain, a virtual object, a character, and the like.

For example, the virtual environment may be provided with a character corresponding to the user 800.

In another example, the virtual environment may be provided with a virtual object, such as a hand or a gun, which corresponds to an input device 500 carried by the user 800.

In another example, the virtual object may include an object that is implemented in the virtual environment and may be used by the user 800 during a virtual experience.

The terrain may be provided at a preset position in the virtual environment.

In addition, the terrain may include an accessible area to which a character is movable or is able to move into and an inaccessible area to which the character is not allowed to move into.

The terrain will be further described below.

In addition, the character may include a non-player character (NPC) and a user character provided by an application or program pre-stored in the auxiliary computing device 300.

For the virtual environment, position data of the character or the object may be represented as virtual position data.

Meanwhile, the position data in reality may include at least one of position coordinates and orientation direction of a target object.

For example, the position data may be position coordinates of the target object located in a tracking area 600.

A server 200 may pre-store a coordinate value related to the tracking area 600.

The server 200 may pre-store a coordinate system related to the tracking area 600. The coordinate system may be at least one of a plane coordinate system, an orthogonal coordinate system, a polar coordinate system, a spatial coordinate system, a cylindrical coordinate system, and a spherical coordinate system.

The server 200 may acquire a coordinate value of the target object in the tracking area 600 on the basis of detecting data and the coordinate system related to the tracking area 600. In addition, the server 200 may acquire the acquired coordinate value of the target object in the tracking area 600 as position data.

In one example, when the detecting data is an infrared image, the server 200 may acquire a coordinate value of the marker in the tracking area 600 on the basis of a position of the marker corresponding to the target object in the infrared image and an installation position of the detecting device 100 that has provided the infrared image. In addition, the server 200 may determine a pattern formed by the marker on the basis of the coordinate value of the marker in the tracking area 600 and identify a target object corresponding to the pattern formed by the marker. In addition, the server 200 may acquire a representative point RP of the target object on the basis of the pattern formed by the marker and the coordinate value of the marker in the tracking area 600, and acquire a coordinate value of the representative point RP of the target object as position data of the target object.

The server 200 may provide the position data to the auxiliary computing device 300.

The auxiliary computing device 300 may pre-store a coordinate value related to a virtual environment.

The auxiliary computing device 300 may pre-store a coordinate system related to the virtual environment. The coordinate system may be at least one of a plane coordinate system, an orthogonal coordinate system, a polar coordinate system, a spatial coordinate system, a cylindrical coordinate system, and a spherical coordinate system.

The auxiliary computing device 300 may acquire a coordinate value of a target object in the virtual environment on the basis of the position data and the coordinate system related to the virtual environment.

For example, the auxiliary computing device 300 may acquire a coordinate value in the virtual environment corresponding to a coordinate value included in the reality position data and acquire the acquired coordinate value in the virtual environment as virtual position data.

The auxiliary computing device 300 may acquire the virtual environment image 452 to be output to the user 800 on the basis of the virtual position data.

According to one embodiment, the auxiliary computing device 300 may acquire virtual position data of the wearable display device 400 as virtual position data of a virtual camera and acquire a field of view 451 of the virtual camera on the basis of the virtual position data of the virtual camera and an orientation direction of the virtual camera.

The auxiliary computing device 300 may acquire the orientation direction of the virtual camera on the basis of an orientation direction included in the position data of the wearable display device 400.

In addition, the auxiliary computing device 300 may acquire a predetermined area in the orientation direction of the virtual camera as the field of view 451 of the virtual camera.

Meanwhile, the field of view 451 of the virtual camera may be acquired on the basis of specific virtual position data in the virtual environment, as well as the virtual position data of the wearable display device 400.

In addition, the auxiliary computing device 300 may acquire the virtual environment image 452 corresponding to the field of view 451 of the virtual camera in the virtual environment.

The auxiliary computing device 300 may provide the virtual environment image 452 to the wearable display device 400.

The wearable display device 400 may output the acquired virtual environment image 452 to the user 800 through the wearable display screen outputter 450.

Figure 9:
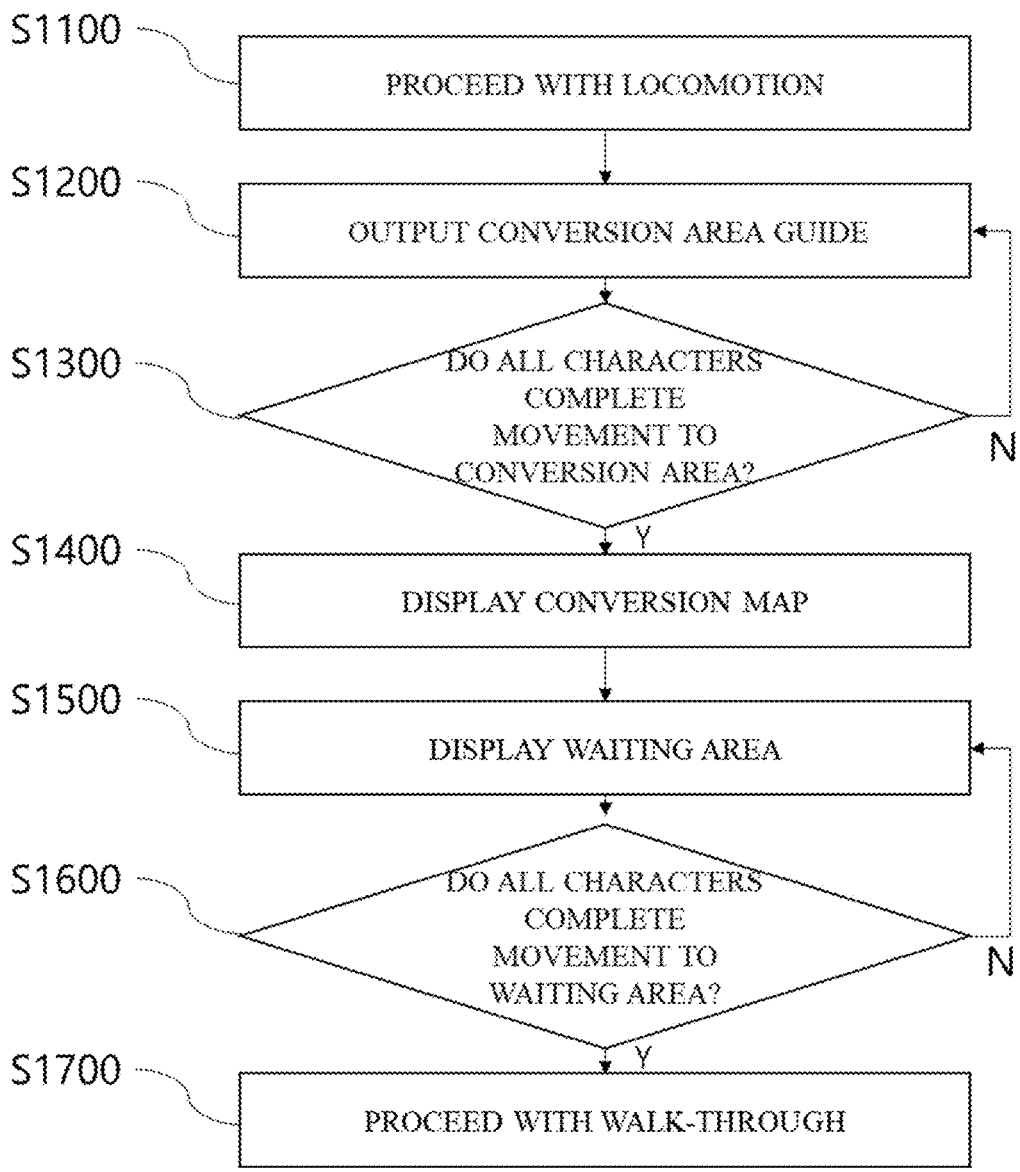
FIG. 9 is a view illustrating a control method of the virtual reality system according to the first embodiment.
Figure 10:
FIG. 10 is a view illustrating a locomotion conversion guide according to the first embodiment.
Figure 11:
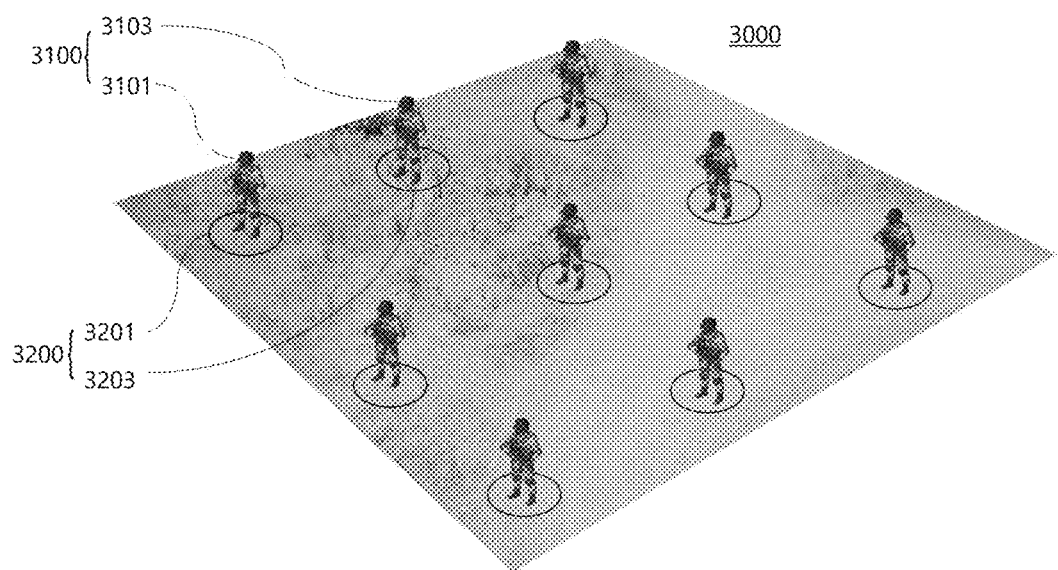
FIG. 11 is a view illustrating a conversion map according to the first embodiment.
Figure 12:
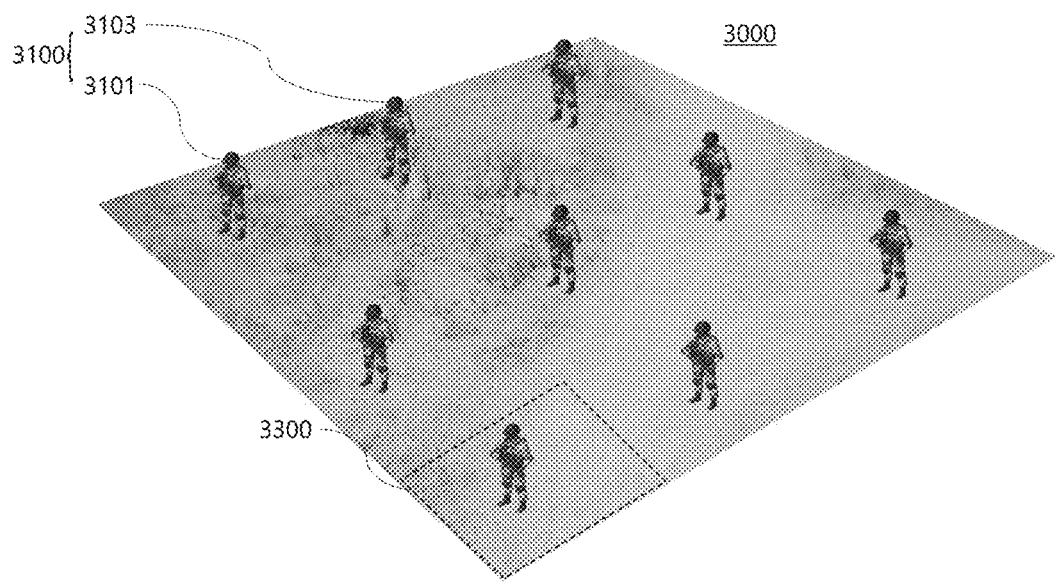
FIG. 12 is a view illustrating a waiting area according to the first embodiment.
Figure 13:
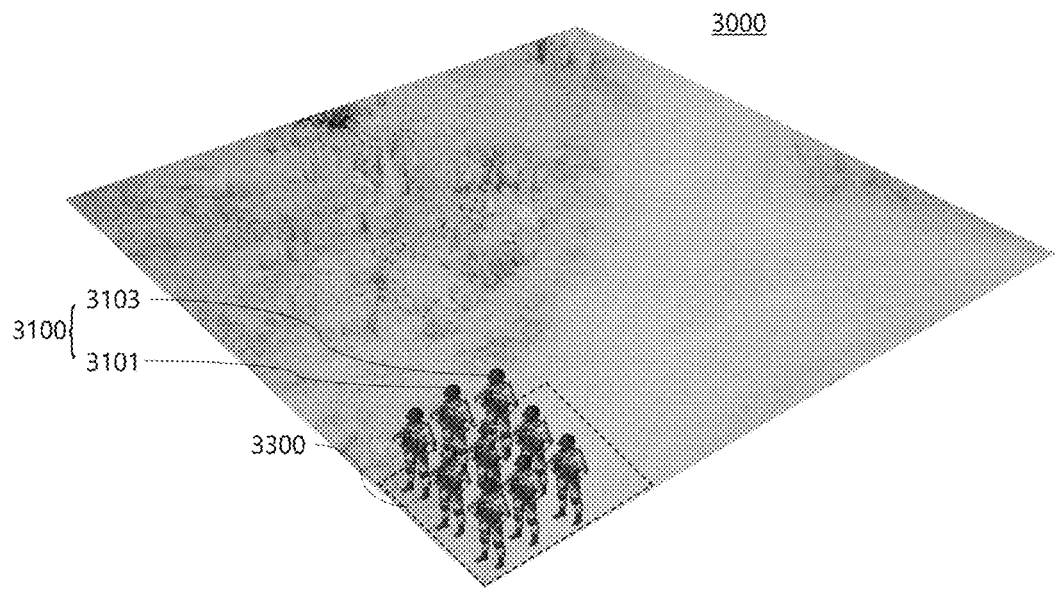
FIG. 13 is a view illustrating a mode conversion completion state according to the first embodiment.

FIG. 9 is a view illustrating a control method of the virtual reality system according to the first embodiment, FIG. 10 is a view illustrating a locomotion conversion guide according to the first embodiment, FIG. 11 is a view illustrating a conversion map according to the first embodiment, FIG. 12 is a view illustrating a waiting area according to the first embodiment, and FIG. 13 is a view illustrating a mode conversion completion state according to the first embodiment.

Referring to FIGS. 9 to 13, a controller of the virtual reality system 10 according to the first embodiment may control the virtual reality system in a locomotion mode and a walk-through mode. The controller may selectively control the virtual reality system in the locomotion mode and the walk-through mode.

Herein, the controller may be at least one or more of the server controller 240, the auxiliary computing controller 340, and the wearable display controller 440. That is, a function of the controller, which will be described below, may be independently performed in any one of the server controller 240, the auxiliary computing controller 340, and the wearable display controller 440, or may be performed by a combination of two or more controllers.

Even when the virtual reality system 10 is controlled in any one mode of the locomotion mode and the walk-through mode, the above-described technology for acquiring a position may be applied as it is.

In the walk-through mode, a play space may be freely used, and the controller may control to acquire first position data and second position data of a first user and a second user who are positioned in the same play space, and then to display a second character corresponding to the second user on a first display worn by the first user, based on the first position data and the second position data.

The controller may display the second character on an area of the first display that corresponds to the second position data.

The locomotion mode may also be performed in the play space, but in the locomotion mode, contents that are not related to the first position data and the second position data of the first user and the second user who are playing in the same play space may be displayed on the first display and a second display, respectively.

In the locomotion mode, the controller may acquire the first position data of the first user and the second position data of the second user, but may not display the second character corresponding to the second user on the first display.

Alternatively, even when the controller displays the second character on the first display, the controller may display the second character as having a distance different from a distance between the first position data and the second position data. In other words, a distance different from a distance in the real play space may be displayed.

The controller may define a safe area in the locomotion mode. The safe area may be a virtual area in the play space, and a plurality of safe areas may be set to be spaced apart from one another in order to prevent a safety accident when a plurality of users use the virtual reality system. In the locomotion mode, characters corresponding to other users in the play space may not be displayed, and accordingly, the controller may define and control a safe area in order to prevent a safety accident by collision.

The controller may control to enable each user to be free to move within the safe area as in the walk-through mode. In this case, the controller may control to proceed with a content based on a position of a user in a space within the safe area.

Hereinafter, a method for converting from the locomotion mode to the walk-through mode will be described with reference to FIGS. 9 to 13.

The controller may proceed with the locomotion mode (S1100).

The controller may determine to convert from the locomotion mode to the walk-through mode based on play of the user.

When conversion from the locomotion mode to the walk-through mode is determined, the controller may display a conversion area guide A as shown in FIG. 9 (S1200).

The controller may display the conversion area guide on a locomotion map 2000. The conversion area guide may be displayed on the locomotion map 2000 to be recognized by the user. The conversion area guide may be displayed on the locomotion map 2000 in a different color.

The locomotion map 2000 and the conversion area guide may be displayed on the display worn on the user. When a character moves to the conversion area, the controller may terminate outputting of the conversion area guide on a display corresponding to the moved character.

For example, when a first character of the first user moves to the conversion area but the second character of the second user does not yet move to the conversion area, the conversion area guide may not be displayed on the first display of the first user anymore, and the conversion area guide may be displayed on the second display of the second user.

The controller may determine whether all characters move to the conversion area (S1300).

The plurality of users may move characters through their respective input devices 500. The user may move the character by operating the input device 500.

When all characters do not complete movement to the conversion area, the controller may continue displaying the conversion area guide on the display of a corresponding user. When all characters complete movement to the conversion area, the controller may display a conversion map 3000 on the displays of the respective users as shown in FIG. 10 (S1400).

A mode in which the controller displays the conversion map 3000 on the displays of the respective users may be defined as a conversion mode. The conversion mode may be the same mode as the walk-through mode.

The plurality of users 3100 may be positioned in a plurality of safe areas 3200 on the conversion map 3000. In the locomotion mode, the controller may control to allow the users to be positioned in the safe areas 3200, which are spaced apart from one another, in order to prevent a collision between the users, and accordingly, the plurality of users 3100 may be positioned, spaced apart from one another when the map is converted into the conversion map 3000.

That is, the plurality of safe areas 3200 may be positioned to be spaced apart from one another on the conversion map.

For example, a first safe area 3201 and a second safe area 3203 may be positioned to be spaced apart from each other. The first user 3101 may be positioned in the first safe area 3201, and the second user 3103 may be positioned in the second safe area 3203. The first user 3101 and the second user 3103 may be positioned to be spaced apart from each other by a first distance.

The controller may display a waiting area 3300 on the conversion map 3000. The controller may display the waiting area 3300 on the displays of the plurality of users. The waiting area 3300 may be displayed on a certain area of the conversion map 3000.

The waiting area 3300 may be displayed to be distinguished from other components of the conversion map 3000. The waiting area 3300 may be displayed in a different color from that of other components of the conversion map 3000. The waiting area 3300 may be a virtual space or may be a space existing in the virtual reality.

The controller may display a waiting area guide on the respective displays so as to enable the plurality of users to find the way to the waiting area 3300. The waiting area guide may be displayed differently according to a current position of a user. For example, when the current position of the user is far away from the waiting area, the waiting area guide of a relatively small size may be displayed, and, when the current position of the user is close to the waiting area, the waiting area guide of a relatively big size may be displayed. When the current position of the user is in such a state that the waiting area can be displayed on the display of the user, the controller may omit the waiting area guide.

The controller may display the waiting area guide on the displays of the plurality of users, thereby guiding the plurality of users to gather in the waiting area.

The waiting area 3300 may have an area smaller than that of the conversion map 3000. The controller may display the conversion map 3000, and may guide the plurality of users to the conversion map 3000. The controller may guide the plurality of users to the conversion map 3000, thereby reducing a distance between the plurality of users.

The controller may determine whether all characters complete movement to the waiting area 3300 (S1600).

The controller may determine whether all users complete movement to the waiting area 3300. The controller may continue displaying the waiting area by using a display when any one of the users does not complete movement to the waiting area 3300.

The controller may display the waiting area 3300 on the display of a user who does not complete movement to the waiting area 3300, and may not display the waiting area 3300 on the display of a user who completes movement to the waiting area 3300. The controller may display a guide for moving to the waiting area 3300 on the display of the user who does not complete movement to the waiting area 3300. The controller may display the guide for moving to the waiting area 3300 only for the user who does not complete movement to the waiting area 3300, thereby inducing the user to move to the waiting area 3300.

The controller may reduce a distance between users in the waiting area 3300 by inducing the user to move to the waiting area 3300. When the distance between the users in the waiting area 3300 is defined as a second distance, the second distance may be shorter than the first distance. That is, the distance between the users positioned in the safe areas 3200 which are converted into the conversion map 3000 may be longer than the distance between the users in the waiting area 3300.

The controller may induce the users to move into the waiting area 3300, so that more efficient walk-through can be performed. That is, since the walk-through mode is a mode in which the users proceed with a virtual reality story while moving, the controller may prepare to efficiently proceed with the walk-through mode by inducing the users to move to the waiting area 3300.

The controller may control to proceed with the conversion mode to display the conversion map and to move the users to the waiting area, so that realistic mode conversion may be performed when the locomotion mode is converted to the walk-through mode, and safety of the users may be guaranteed.

The controller may control to proceed with the walk-through mode when all characters complete movement to the waiting area 3300 as shown in FIG. 13 (S1700).

The controller may complete mode conversion when all characters complete movement to the waiting area 3300, and may control to proceed with the walk-through mode.

FIGS. 14 to 18 are views illustrating conversion from the walk-through mode to the locomotion mode in the virtual reality system according to the first embodiment.

Figure 14:
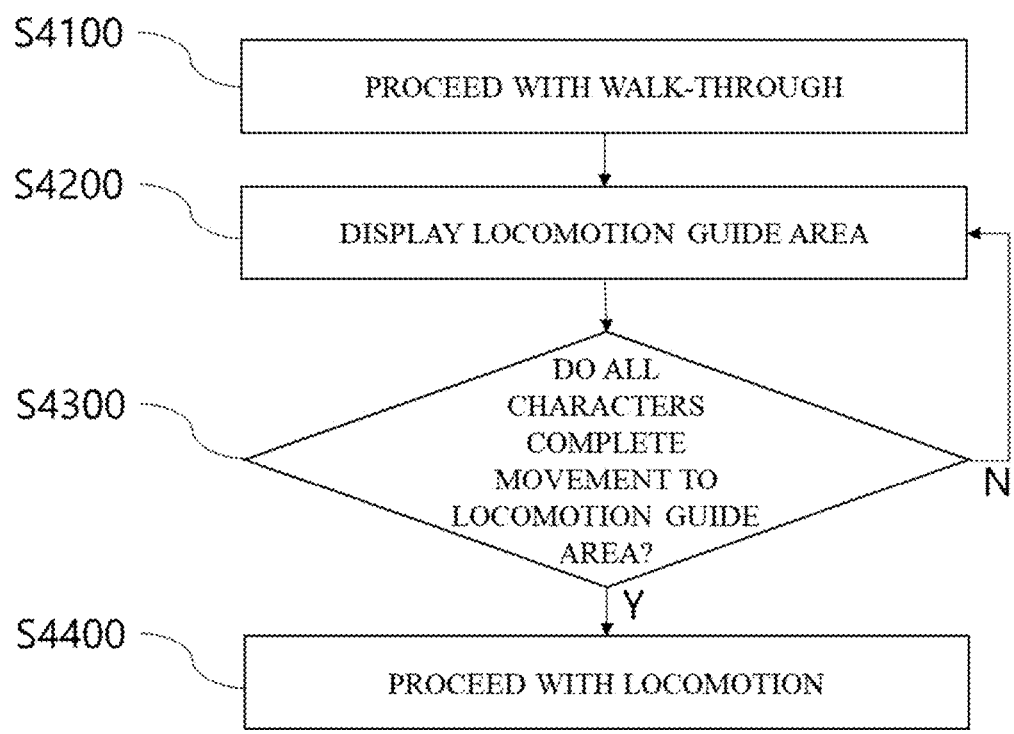
FIG. 14 is a view illustrating a control method of the virtual reality system according to the first embodiment.
Figure 15:
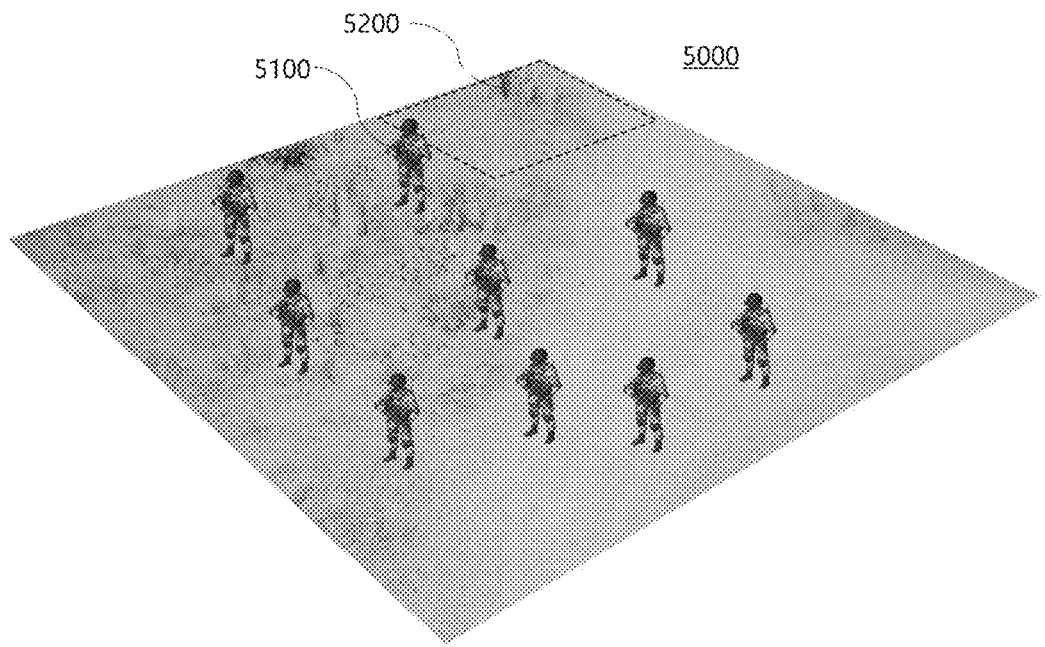
FIG. 15 is a view illustrating a walk-through target area according to the first embodiment.
Figure 16:
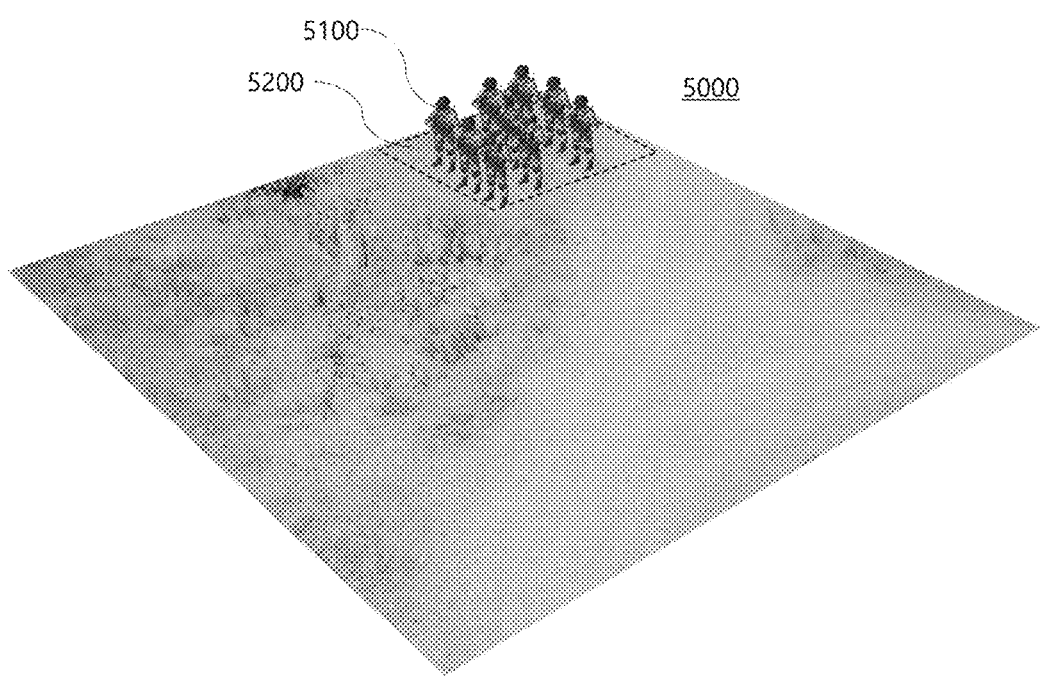
FIG. 16 is a view illustrating a state in which all users move to the walk-through target area according to the first embodiment.
Figure 17:
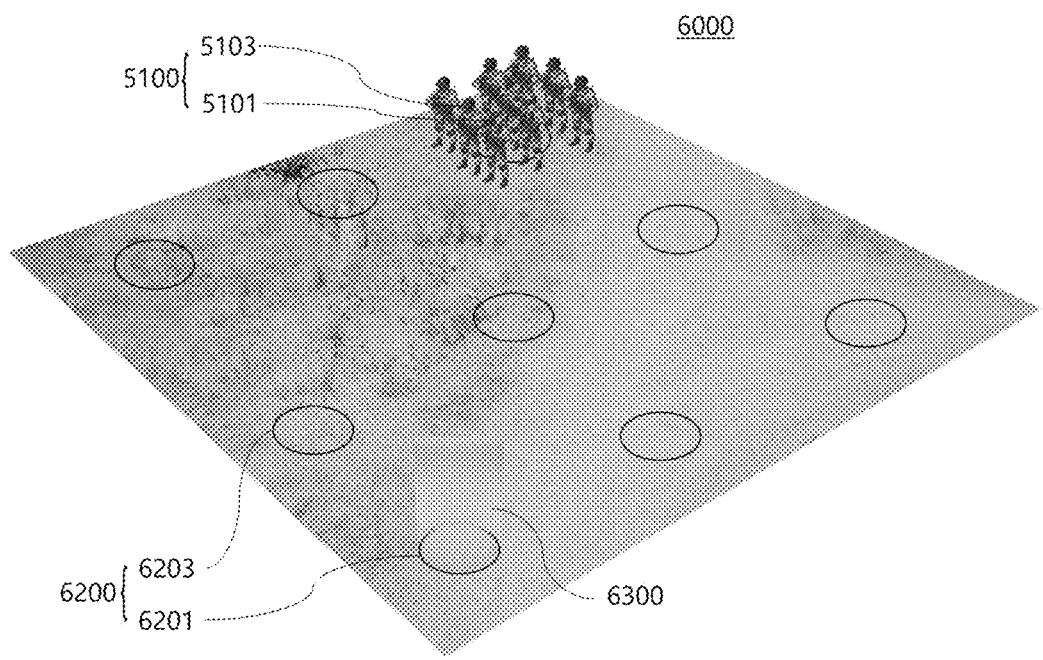
FIG. 17 is a view illustrating a locomotion conversion map.
Figure 18:
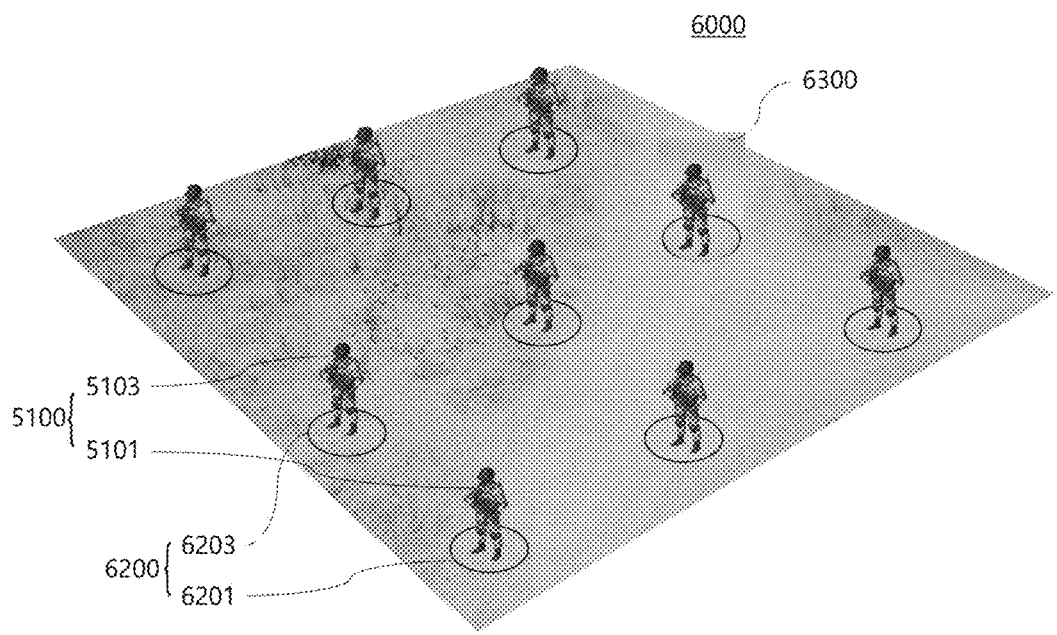
FIG. 18 is a view illustrating a locomotion conversion completion state according to the first embodiment.

FIG. 14 is a view illustrating a control method of the virtual reality system according to the first embodiment, FIG. 15 is a view illustrating a walk-through target area according to the first embodiment, FIG. 16 is a view illustrating a state in which all users move to the walk-through target area according to the first embodiment, FIG. 17 is a view illustrating a locomotion conversion map, and FIG. 18 is a view illustrating a locomotion conversion completion state according to the first embodiment.

Referring to FIGS. 14 to 18, the controller of the virtual reality system 10 according to the first embodiment may control the virtual reality control system in the walk-through mode (S4100).

The controller may display a walk-through map 5000 as shown in FIG. 15. The controller may display a target area 5200 on the walk-through map 5000.

The target area 5200 may be a part of the area of the walk-through map 5000. The target area 5200 may be a trigger area for proceeding with a scenario in the walk-through mode.

The controller may display the target area 5200 on a display worn on a user 5100. The controller may display a guide for inducing movement to the target area 5200 on the display worn on the user 5100 in order for the user 5100 to move to the target area 5200.

The controller may determine whether all users 5100 arrives in the target area 5200 as shown in FIG. 16.

When all users 5100 are positioned in the target area 5200, the controller may convert the walk-through map 5000 to a locomotion conversion map 6000 as shown in FIG. 17.

The controller may display a locomotion guide area 6200 on the locomotion conversion map 6000 (S4200).

The controller may display a plurality of locomotion guide areas 6200 allocated to the plurality of users 5100, respectively. The controller may output the locomotion guide areas 6200 on respective displays of the plurality of users 5100.

The locomotion guide area 6200 may be a part of the area of the locomotion conversion map 6000.

For example, the controller may output a first locomotion guide area 6201 for a first user 5101. The controller may output a second locomotion guide area 6203 for a second user 5103.

The first locomotion guide area 6201 and the second locomotion guide area 6203 may be areas that are spaced apart from each other. The first locomotion guide area 6201 and the second locomotion guide area may have a third distance therebetween. The third distance may be longer than a distance between the users positioned in the target area 5200.

The locomotion guide area 6200 may be allocated based on position data of the user 5100 positioned in the target area 5200. The locomotion guide area 6200 may be allocated to minimize a collision between the users while the user 5100 is moving to the locomotion guide area 6200.

The controller may allocate the locomotion guide areas 6200 to users who are positioned on an outside area among the users 5100 positioned in the target area 5200, first, and may allocate the locomotion guide areas 6200 to users who are positioned on a center area later.

The controller may allocate a locomotion guide area 6200 that is farthest away from the target area 5200 among the locomotion guide areas 6200, first, and may allocate a locomotion guide area 6200 that has a relatively short distance to the target area 5200 later.

The controller may allocate the locomotion guide area 6200 that is farthest away from the target area 5200 among the locomotion guide areas 6200 to a user who is closest to the corresponding locomotion guide area 6200, and afterward, may allocate the farthest locomotion guide area 6200 to a user who is closest to the corresponding locomotion guide area 6200.

For example, the controller may allocate the first locomotion guide area 6201 that is farthest away from the target area 5200 to the first user 5101 who has the shortest distance from the first locomotion guide area 6201, and afterward, may allocate the second locomotion guide area 6203 that is farthest away among the locomotion guide areas except for the already allocated first locomotion guide area 6201 to the second user 5103 who has the shortest distance from the second locomotion guide area 6203.

Accordingly, a collision between the users moving toward the locomotion guide areas 6200 from the target area 5200 may be minimized.

The locomotion guide area 6200 may be displayed only on the display of the allocated user. The first locomotion guide area 6201 may be displayed only on the display of the first user 5101, and may not be displayed on the display of the second user 5103.

The locomotion guide area 6200 may not be outputted anymore when the user completes movement to the allocated locomotion guide area 6200.

The controller may output an additional effect 6300 to allow the locomotion guide area 6200 to be more effectively recognized by the user. The additional effect 6300 may be outputted on the locomotion guide area 6200. In this case, the additional effect 6300 may be displayed on the locomotion guide area 6200 allocated to each user through the display of each user.

The additional effect 6300 may not be outputted anymore when the user completes movement to the allocated locomotion guide area 6200.

Alternatively, the additionally effect 6300 may be outputted only when the user completes movement to the allocated locomotion guide area 6200. In this case, the additional effect 6300 may be displayed on the displays of all users. Accordingly, the controller may allow the user who completes movement to the locomotion guide area 6200 among the users to recognize.

The controller may identify whether all users complete movement to the locomotion guide area 6200 (S4300).

When any one of the users does not complete movement to the locomotion guide area, the controller may continue outputting the locomotion guide area 6200.

The controller may proceed with the locomotion mode when all users complete movement to the locomotion guide area as shown in FIG. 18 (S4400).

When the walk-through mode is converted to the locomotion mode, the controller guides through the locomotion guide area so as to increase the distance between the users longer than in the walk-through mode, thereby preventing a collision between the users in the locomotion mode.

Figure 19:
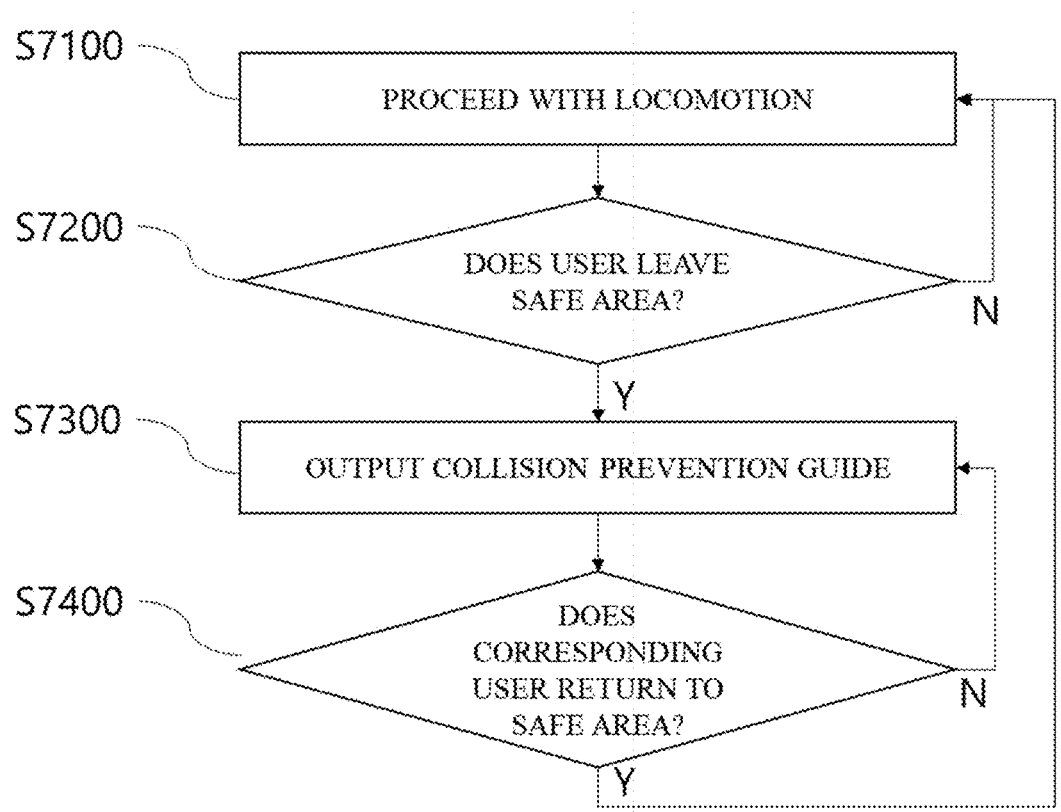
FIG. 19 is a view illustrating a control method of the virtual reality control system which prepares in case a user leaves according to a second embodiment.
Figure 20:
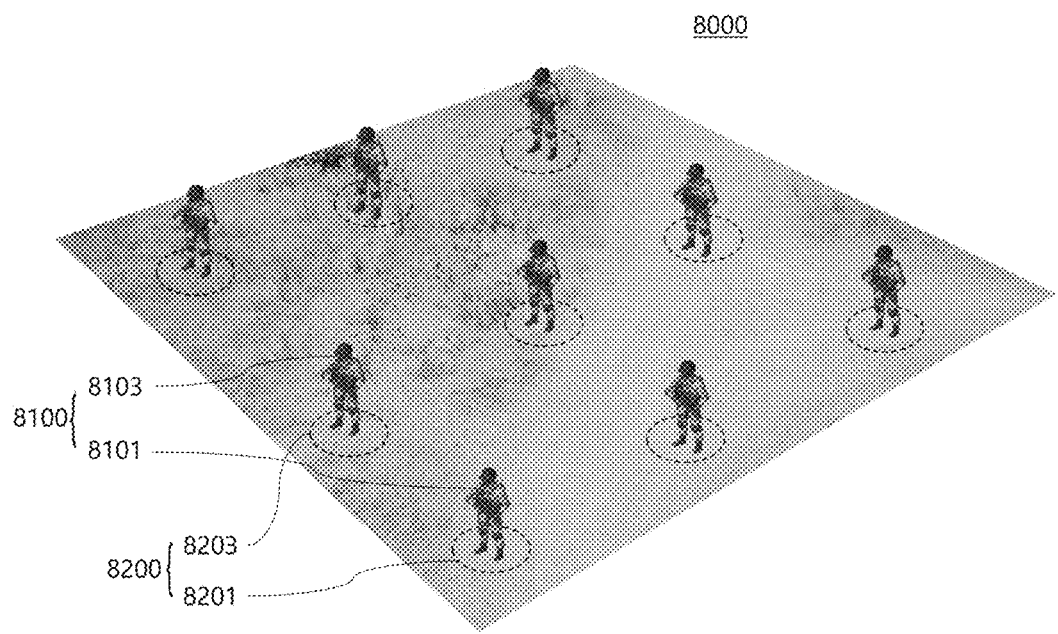
FIG. 20 is a view illustrating a locomotion map according to the second embodiment.
Figure 21:
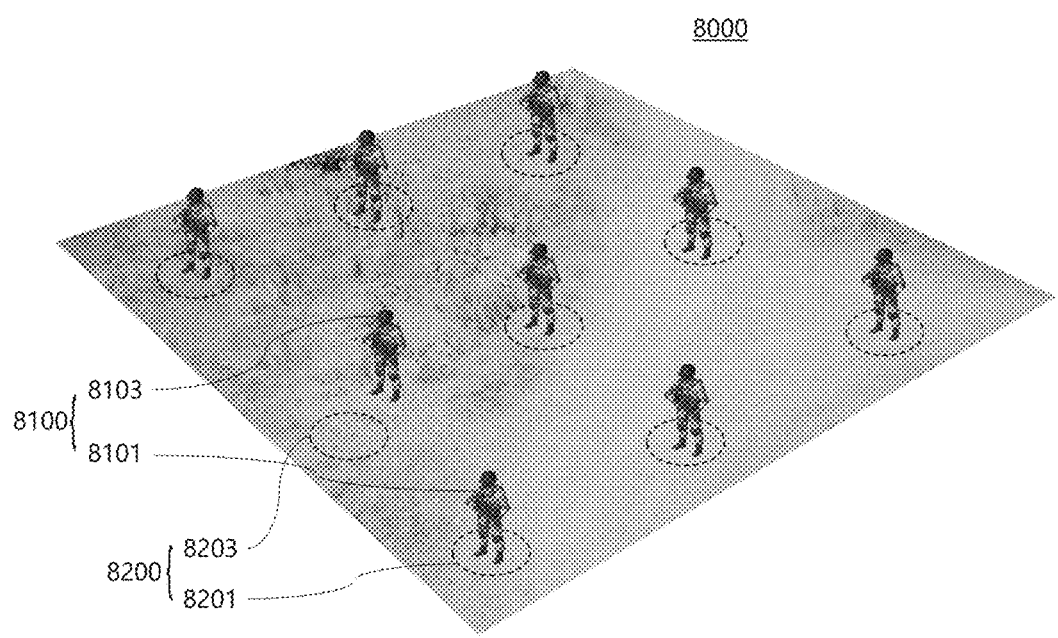
FIG. 21 is a view illustrating a user who leaves according to the second embodiment.
Figure 22:
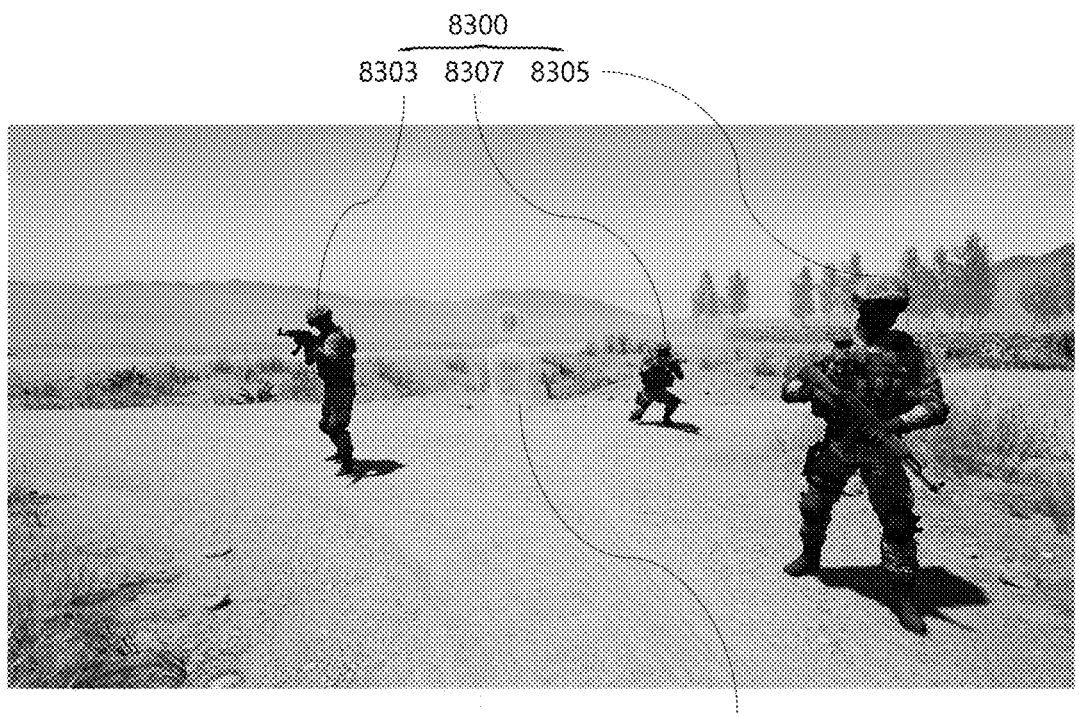
FIG. 22 is a view illustrating a collision prevention guide outputted on a display of a user according to the second embodiment.
Figure 23:
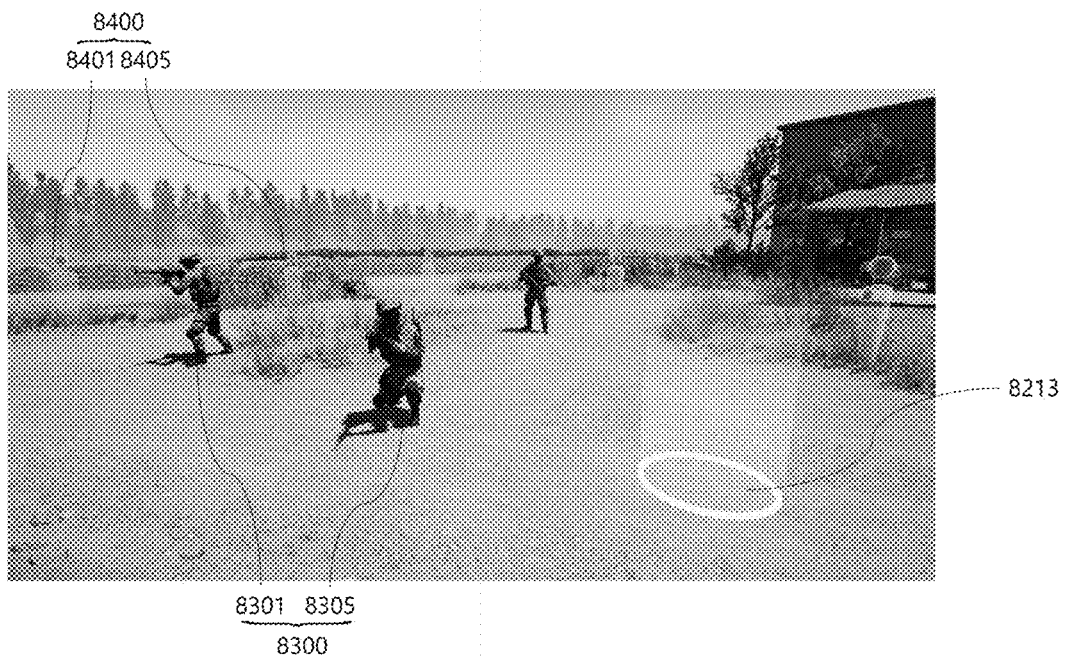
FIG. 23 is a view illustrating a collision prevention guide outputted on a display of a user who leaves according to the second embodiment.

FIG. 19 is a view illustrating a control method of the virtual reality control system which prepares in case a user leaves according to a second embodiment, FIG. 20 is a view illustrating a locomotion map according to the second embodiment, FIG. 21 is a view illustrating a state in which a user leaves according to the second embodiment, FIG. 22 is a view illustrating a collision prevention guide outputted on a display of a user according to the second embodiment, and FIG. 23 is a view illustrating a collision prevention guide outputted on a display of a user who leaves according to the second embodiment.

The second embodiment is an additional embodiment regarding a collision prevention guide which is outputted when a user leaves a safe area in the locomotion mode according to the first embodiment. Accordingly, in explaining the second embodiment, the same reference numerals are used for the same components as in the first embodiment and a detailed description is omitted.

Referring to FIG. 19, the controller may control the virtual reality system in the locomotion mode (S7100).

The controller may constitute a locomotion map 8000 and may define a plurality of safe areas 8200 as shown in FIG. 20.

The safe areas 8200 may be defined as being spaced apart from one another in order to prevent a collision between users 8100. For example, the first safe area 8201 may be defined as being spaced apart from the second safe area 8203.

The users 8100 may proceed with contents on the safe areas 8200 in the locomotion mode. For example, the first user 8101 may proceed with a locomotion scenario in the first safe area 8201, and the second user 8103 may proceed with a locomotion scenario in the second safe area 8203.

A first character corresponding to the first user 8101 may be outputted on the display of the second user 8103, and a second character corresponding to the second user 8103 may be outputted on the display of the first user 8101. However, the first character outputted on the display of the second user 8103 may not reflect first position data of the first user 8101. The first character outputted on the display of the second user 8103 may reflect only data regarding a direction of the first user 8101. That is, even when the first user 8101 moves within the first safe area 8201, the first character of the first user 8101 may be shown as if the first character stands still on the display of the second user 8103. However, when the first user 8101 rotates within the first safe area 8201, the first character may be displayed as rotating on the display of the second user 8103.

Since the safe area 8200 is an area that is configured to prevent a collision between the users 8100, there may be a risk of collision between the users when one of the users 8100 leaves the safe area 8200. Accordingly, there is a need for a collision prevention guide to prevent the collision.

The controller may determine whether one of the plurality of users existing in the play space leaves the safe area (S7200).

For example, when the second user 8103 leaves the second safe area 8203 as shown in FIG. 21, the controller may detect the second user 8203's leaving.

The controller may continue proceeding with the locomotion when all users 8100 are positioned in the safe areas 8200.

When one of all users 8100 leaves the safe area, the controller may output a collision prevention guide (S7300).

The collision prevention guide may be displayed on the display of the user 8100. The collision prevention guide may be displayed on the displays of a leaver and a non-leaver in different forms.

The collision prevention guide may be outputted in a different form according to a distance from the safe area to the leaver.

When the second user 8103 leaves the safe area 8203, an image as shown in FIG. 22 may be displayed on the display of the first user 8101.

Characters 8300 corresponding to the plurality of users positioned on the locomotion map 8000 may be displayed on the first display of the first user 8101. A second character 8303, a third character 8305, and a fourth character 8307 may be displayed on the first display of the first user 8101.

Even when the second user 8103 leaves the second safe zone 8203, the second character 8303 may be outputted at a previous position.

The collision prevention guide outputted on the first display may be a second ghost image 8403 corresponding to the second user 8103. The second ghost image 8403 may be outputted in a different form from the second character 8303. The second ghost image 8403 may be outputted based on second position data of the second user 8103. The second ghost image 8403 may be outputted at a position reflecting a real position of the second user 8103.

When the second user 8103 leaves, the controller may output the second ghost image 8403 reflecting the position of the second user 8103 on the first display of the first user 8201 who does not leave, so that a collision between the first user 8101 and the second user 8103 may be prevented.

The second ghost image 8403 may be outputted as an image having high brightness so as to be easily recognized by the first user 8101. In this case, the controller may output a voice or image message to users who do not leave regarding occurrence of a user who leaves the safe area.

In addition, when a plurality of users leave the safe areas 8200, the controller may output ghost images corresponding to positions of the plurality of users who leave on the first display.

When the second user 8103 leaves the second safe area 8203, an image as shown in FIG. 22 may be displayed on the second display of the second user 8103.

The controller may display a character 8300, a ghost image 8400, and a safe area guide 8213 on the second display.

The controller may display the ghost image 8400 and the safe area guide 8213 as the collision prevention guide.

The first character 8301 and the third character 8305 may be outputted on the second display. The first character 8301 and the third character 8305 may be displayed on positions that do not reflect the current positions of the users.

A first ghost image 8401 and a third ghost image 8405 may be displayed on the second display. The ghost images 8400 corresponding to all users existing in the play space may be outputted on the second display.

The first ghost image 8401 may be an image that corresponds to position data of the first user 8101, and the third ghost image may be an image that corresponds to position data of the third user. The first ghost image 8401 may be outputted at a position that reflects a real position of the first user 8101. All ghost images 8400 may be outputted at positions that reflect respective positions of all users.

Since the second user 8103 leaving the safe area has a high possibility of colliding with other users, the ghost images 8400 reflecting positions of all users may be outputted to prevent a collision between the users.

The controller may output the safe area guide 8213 on the second display. The safe area guide 8213 may guide about a position to which the second user 8103 should return. The safe area guide 8213 may be displayed on a position corresponding to the second safe area 8203.

The controller may output a leave warning message informing that the second user 8103 leaves the safe area to the second display. Alternatively, the controller may output a message informing that the second user 8103 leaves the safe area to the second user 8103 as a voice.

The controller may output the leave warning message in a different form according to a distance between the second position data of the second user 8103 and the second safe area 8203. That is, the controller may output a leave warning message of a different form when the second user 8103 leaves the second safe area 8203 by a pre-set critical distance or longer.

In addition, the controller may output an imminent collision message based on position data of the second user 8103 and other users. That is, the controller may output the imminent collision message when there is a risk of collision as the second user 8103 is closer to another user within a predetermined range. The imminent collision message may be outputted to a user existing within a predetermined range from the second user 8103.

When a distance between the second user 8103 and the second safe area 8203 is longer than or equal to a critical distance, the controller may output an image different from the locomotion content image. In this case, the controller may control to output the image different from the locomotion content image to the display of all users.

When a camera is installed on the second display of the second user 8103 to capture in an orientation direction of the second user, the controller may control to output an image captured by the camera on the second display. The image captured by the camera may be outputted on the second display, so that the second user 8103 may recognize a reality space and a collision between the users may be prevented.

The controller may determine whether the user leaving the safe area returns to the safe area (S7400).

The controller may determine whether the second user 8103 returns to the second safe area 8203.

The controller may continue outputting the collision prevention guide when the second user 8103 does not return to the safe area 8203.

The controller may stop outputting the collision prevention guide when the second user 8103 completes returning to the safe area 8203, and may control such that the second user 8103 proceeds with the locomotion mode again.

Various embodiments described above may be implemented within a recording medium readable by a computer or a similar device thereto by using software, hardware, or a combination of these. In some circumstances, embodiments described in the specification may be implemented by a processor itself. When implemented by software, embodiments such as procedures and functions described in the specification may be implemented by separate software modules. Each of the software modules may perform one or more functions and operations described in the specification.

Computer instructions for performing processing operations according to various embodiments of the disclosure described above may be stored in a non-transitory computer-readable medium. The computer instructions stored in the non-transitory computer-readable medium may cause a specific device to perform the processing operations according to various embodiments described above when being executed by a processor.

The non-transitory computer-readable medium refers to a medium that stores data semi-permanently rather than storing data for a very short time, such as a register, a cache, a memory, or the like, and is readable by a device. Specific examples of the non-transitory computer-readable medium may include a compact disc (CD), a digital versatile disk (DVD), a hard disk, a Blu-ray disk, a universal serial bus (USB), a memory card, a read only memory (ROM), or the like.

A storage medium readable by a device may be provided in the form of a non-transitory storage medium. Herein, the 'non-transitory storage medium' refers to a tangible device, and only means that a signal (for example, radio waves) is not included, and this term does not distinguish between a case in which data is semi-permanently stored in a storage medium and a case in which data is temporarily stored. For example, the 'non-transitory storage medium' may include a buffer in which data is temporarily stored.

The method according to various embodiments of the disclosure may be included and provided in a computer program product. The computer program product may be traded as a product between a seller and a buyer. The computer program product may be distributed in the form of a device-readable storage medium (e.g., compact disc read only memory (CD-ROM)), or be distributed (for example, downloaded or uploaded) online directly via an application store (for example, Play Store™) or between two user devices (for example, smartphones). If distributed online, at least part of the computer program product (for example, a downloadable app.) may be at least temporarily stored or temporarily generated in the device-readable storage medium, such as a memory of the manufacturer's server, a server of the application store, or a relay server.

While preferred embodiments of the disclosure have been illustrated and described, the disclosure is not limited to the above-described specific embodiments. Various changes can be made by a person skilled in the art without departing from the scope of the disclosure claimed in the claims, and also, changed embodiments should not be understood as being separate from the technical idea or prospect of the disclosure.

The invention claimed is:

1. A virtual reality control system comprising:
a sensor configured to detect an optical signal by emitting light to a target object and receiving light;
a first display configured to output an image to a first user who uses a play space;
a second display configured to output an image to a second user who uses the play space; and
at least one or more controllers configured to control at least one of the first display and the second display,
wherein the controller is configured to:
acquire first position data of the first user and second position data of the second user, based on the optical signal;
output an image to the first display based on the first position data;
control the first display and the second display in a walk-through mode and a locomotion mode, wherein the walk-through mode is a mode in which a first character corresponding to the first user is moved in a virtual space based on the first position data and a second character corresponding to the second user is moved in the virtual space based on the second position data, and wherein the locomotion mode is a mode in which the first character is moved in the virtual space based on an operation of a first controller operated by the first user and the second character is moved in the virtual space based on an operation of a second controller operated by the second user; and when the walk-through mode is converted to the locomotion mode, display a first position guide to make a distance between the first position data and the second position data longer than or equal to a first distance in order to space the first user and the second user apart from each other, wherein the first position guide comprises a first locomotion guide area which is displayed on the first display, and a second locomotion guide area which is displayed on the second display, wherein the first locomotion guide area and the second locomotion guide area are spaced apart from each other, display an additional effect on the first locomotion guide area through the first display and on the second locomotion guide area through the second display, guide the first user and the second user to respectively move to the first locomotion guide area and the second locomotion guide area, stop displaying the additional effect on the first locomotion guide area and the second locomotion guide area when the first user and the second user complete movement to the first locomotion guide area and the second locomotion guide area, respectively, initiate the locomotion mode only after detecting that the first user is positioned in the first locomotion guide area and the second user is positioned in the second locomotion guide area, and refrain from displaying the second character corresponding to the second user on the first display in the locomotion mode while displaying the second character corresponding to the second user on the first display in the walk-through mode.

2. The virtual reality control system of claim 1, wherein, when the locomotion mode is converted to the walk-through mode, the controller is configured to display a second position guide to make the distance between the first position data and the second position data shorter than a second distance in order to gather the first user and the second user, wherein the second position guide is a waiting area that is defined as a part of the play space, and when both the first position data and the second position data are positioned in the waiting area, the controller is configured to convert the first display and the second display to the walk-through mode.

3. The virtual reality control system of claim 2, wherein the first distance is longer than the second distance.

4. The virtual reality control system of claim 1, wherein the controller is configured to:
restrain from displaying a second character corresponding to the second user on the first display in the locomotion mode; and
display the second character corresponding to the second user on the first display in the walk-through mode.

5. The virtual reality control system of claim 1, wherein the controller is configured to control the first display and the second display in a conversion mode when the locomotion mode is converted to the walk-through mode, and
wherein the controller is configured to display the waiting area on the first display and the second display in the conversion mode.

6. The virtual reality control system of claim 5, wherein the waiting area is displayed at a same position on the first display and the second display in the play space.

7. The virtual reality control system of claim 5, wherein the controller is configured to display a conversion map in the conversion mode, and to display the second character corresponding to the second user on the first display.

8. The virtual reality control system of claim 5, wherein, when a first character corresponding to the first user is positioned in a conversion area and the second character corresponding to the second user is positioned in the conversion area, the controller is configured to control the first display and the second display in the conversion mode.

9. The virtual reality control system of claim 8, wherein movement of the first character to the conversion area is performed by the first user operating a first controller, and
wherein movement of the second character to the conversion area is performed by the second user operating a second controller.

10. The virtual reality control system of claim 9, wherein, even when the first character moves to the conversion area, the first position data is not changed.

* * * * *